US010628504B2

(12) United States Patent
Mital et al.

(10) Patent No.: US 10,628,504 B2
(45) Date of Patent: *Apr. 21, 2020

(54) SYSTEM OF PROVIDING SUGGESTIONS BASED ON ACCESSIBLE AND CONTEXTUAL INFORMATION

(71) Applicant: Microsoft Technology Licensing, LLC, Redmond, WA (US)

(72) Inventors: Vijay Mital, Kirkland, WA (US); Darryl Ellis Rubin, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/713,373

(22) Filed: May 15, 2015

(65) Prior Publication Data
US 2015/0248494 A1    Sep. 3, 2015

Related U.S. Application Data

(63) Continuation of application No. 12/848,082, filed on Jul. 30, 2010, now Pat. No. 9,043,296.

(51) Int. Cl.
*G06F 7/00* (2006.01)
*G06F 16/9535* (2019.01)
(Continued)

(52) U.S. Cl.
CPC .... *G06F 16/9535* (2019.01); *G06F 16/24575* (2019.01); *G06F 16/90328* (2019.01); *G06F 17/27* (2013.01); *G06F 16/3347* (2019.01)

(58) Field of Classification Search
CPC .................................................. G06F 16/3347
(Continued)

(56) References Cited

U.S. PATENT DOCUMENTS 4,633,430 A    12/1986 Cooper
5,189,633 A    2/1993 Bonadio
(Continued)

FOREIGN PATENT DOCUMENTS

CN    1395196 A    2/2003
CN    1489740 A    4/2004
(Continued)

OTHER PUBLICATIONS

Google Inc., "Google Chart Tools", 2010 Google.
(Continued)

*Primary Examiner* — Eliyah S. Harper
(74) *Attorney, Agent, or Firm* — Workman Nydegger

(57) ABSTRACT

A system and method for offering suggestions to a user of a mobile computing device based on information relevant to the user and a context data. The mobile computing device has access to lists of data associated with the user. The mobile computing device also has a sensor for detecting data about the user's context. Based on the lists of information and the contextual data, the device generates a hypothesis as to information that may be of interest to the user. Using context data in conjunction with lists in this fashion focuses the system on information likely of interest, without requiring express user input. A search may be performed in accordance with the hypothesis. Based on the results of the search, one or more suggestions are then presented by the mobile computing device to the user. The user has the option to provide feedback input to the device resulting in an update of the suggestion.

20 Claims, 9 Drawing Sheets

(51) Int. Cl.
*G06F 16/2457* (2019.01)
*G06F 16/9032* (2019.01)
*G06F 17/27* (2006.01)
*G06F 16/33* (2019.01)

(58) Field of Classification Search
USPC .................................................. 707/758, 736
See application file for complete search history.

(56) References Cited

U.S. PATENT DOCUMENTS

| | | | |
|---|---|---|---|
| 5,355,496 A | 10/1994 | Fant et al. | |
| 5,469,538 A | 11/1995 | Razdow | |
| 5,481,741 A | 1/1996 | McKaskle et al. | |
| 5,491,779 A | 2/1996 | Bezjian | |
| 5,528,735 A | 6/1996 | Strasnick et al. | |
| 5,535,385 A | 7/1996 | Griffin et al. | |
| 5,537,618 A | 7/1996 | Boulton et al. | |
| 5,555,354 A | 9/1996 | Strasnick et al. | |
| 5,669,007 A | 9/1997 | Tateishi | |
| 5,675,746 A | 10/1997 | Marshall | |
| 5,732,001 A | 3/1998 | Nakayama et al. | |
| 5,764,241 A | 6/1998 | Elliott et al. | |
| 5,809,499 A | 9/1998 | Wong et al. | |
| 5,818,737 A | 10/1998 | Orr et al. | |
| 5,874,955 A | 2/1999 | Rogowitz et al. | |
| 5,918,232 A | 6/1999 | Pouschine et al. | |
| 5,923,324 A | 7/1999 | Berry et al. | |
| 5,945,976 A | 8/1999 | Iwamura et al. | |
| 6,006,230 A | 12/1999 | Ludwig et al. | |
| 6,032,146 A | 2/2000 | Chadha et al. | |
| 6,034,697 A | 3/2000 | Becker | |
| 6,038,560 A | 3/2000 | Wical | |
| 6,063,126 A | 5/2000 | Borduin | |
| 6,073,115 A | 6/2000 | Marshall | |
| 6,085,978 A | 7/2000 | Knowles et al. | |
| 6,088,698 A | 7/2000 | Lipkin | |
| 6,104,410 A | 8/2000 | Wong | |
| 6,175,954 B1 | 1/2001 | Nelson et al. | |
| 6,189,012 B1 | 2/2001 | Mital et al. | |
| 6,208,985 B1 | 3/2001 | Krehel | |
| 6,211,887 B1 | 4/2001 | Meier et al. | |
| 6,222,533 B1 | 4/2001 | Notani et al. | |
| 6,239,796 B1 | 5/2001 | Alexander | |
| 6,260,035 B1 | 7/2001 | Horvitz et al. | |
| 6,263,339 B1 | 7/2001 | Hirsch | |
| 6,266,053 B1 | 7/2001 | French et al. | |
| 6,269,325 B1 | 7/2001 | Lee et al. | |
| 6,286,017 B1 | 9/2001 | Egilsson | |
| 6,301,584 B1 | 10/2001 | Ranger | |
| 6,314,420 B1 | 11/2001 | Lang et al. | |
| 6,326,962 B1 | 12/2001 | Szabo | |
| 6,370,526 B1 | 4/2002 | Agrawal et al. | |
| 6,385,563 B1 | 5/2002 | Vora et al. | |
| 6,463,428 B1 | 10/2002 | Lee et al. | |
| 6,473,753 B1 | 10/2002 | Katariya et al. | |
| 6,484,164 B1 | 11/2002 | Nikolovska et al. | |
| 6,512,530 B1 | 1/2003 | Rzepkowski et al. | |
| 6,536,037 B1 | 3/2003 | Guheen et al. | |
| 6,581,054 B1 | 6/2003 | Bogrett | |
| 6,639,614 B1 | 10/2003 | Kosslyn et al. | |
| 6,647,119 B1 | 11/2003 | Slezak | |
| 6,662,146 B1 | 12/2003 | Watts | |
| 6,687,657 B2 | 2/2004 | Levin | |
| 6,690,370 B2 | 2/2004 | Ellenby et al. | |
| 6,691,100 B1 | 2/2004 | Alavi et al. | |
| 6,707,454 B1 | 3/2004 | Barg et al. | |
| 6,714,868 B2 | 3/2004 | Picone et al. | |
| 6,717,599 B1 | 4/2004 | Olano | |
| 6,753,885 B2 | 6/2004 | Stoakley et al. | |
| 6,823,299 B1 | 11/2004 | Contreras et al. | |
| 6,831,603 B2 | 12/2004 | Menache | |
| 6,836,270 B2 | 12/2004 | Du | |
| 6,842,175 B1 | 1/2005 | Schmalstieg et al. | |
| 6,856,980 B2 | 2/2005 | Feldman et al. | |
| 6,865,720 B1 | 3/2005 | Otani et al. | |
| 6,867,788 B1 | 3/2005 | Takeda | |
| 6,868,525 B1 | 3/2005 | Szabo | |
| 6,906,712 B2 | 6/2005 | Lee et al. | |
| 6,912,515 B2 | 6/2005 | Jackson et al. | |
| 6,922,681 B2 | 7/2005 | Fromherz et al. | |
| 6,928,436 B2 | 8/2005 | Baudel | |
| 6,931,589 B2 | 8/2005 | Baltsan et al. | |
| 6,948,154 B1 | 9/2005 | Rothermel et al. | |
| 6,957,191 B1 | 10/2005 | Belcsak et al. | |
| 6,959,432 B2 | 10/2005 | Crocker | |
| 6,963,824 B1 | 11/2005 | Davidson et al. | |
| 6,968,333 B2 | 11/2005 | Abbott et al. | |
| 6,981,040 B1 | 12/2005 | Konig et al. | |
| 6,982,712 B2 | 1/2006 | Ohto | |
| 6,983,227 B1 | 1/2006 | Thalhammer-Reyero | |
| 6,983,236 B1 | 1/2006 | Karlovac et al. | |
| 6,985,623 B2 | 1/2006 | Prakash et al. | |
| 6,990,238 B1 | 1/2006 | Saffer et al. | |
| 6,995,768 B2 | 2/2006 | Jou et al. | |
| 7,028,306 B2 | 4/2006 | Boloker et al. | |
| 7,038,680 B2 | 5/2006 | Pitkow | |
| 7,039,569 B1 | 5/2006 | Haws et al. | |
| 7,047,168 B2 | 5/2006 | Carballo et al. | |
| 7,054,755 B2 | 5/2006 | O'Reilly et al. | |
| 7,055,107 B1 | 5/2006 | Rappaport et al. | |
| 7,058,896 B2 | 6/2006 | Hughes | |
| 7,072,888 B1 | 7/2006 | Perkins | |
| 7,089,220 B2 | 8/2006 | Fromherz et al. | |
| 7,089,221 B2 | 8/2006 | Fromherz et al. | |
| 7,099,890 B2 | 8/2006 | Cahill et al. | |
| 7,102,643 B2 | 9/2006 | Moore et al. | |
| 7,107,277 B1 | 9/2006 | Mitra et al. | |
| 7,114,127 B2 | 9/2006 | Weitzman | |
| 7,139,764 B2 | 11/2006 | Lee | |
| 7,165,105 B2 | 1/2007 | Reiner et al. | |
| 7,177,798 B2 | 2/2007 | Hsu et al. | |
| 7,203,909 B1 * | 4/2007 | Horvitz | G06Q 30/0256 |
| | | | 715/765 |
| 7,212,200 B2 | 5/2007 | Fujita et al. | |
| 7,216,116 B1 | 5/2007 | Nilsson et al. | |
| 7,219,307 B2 | 5/2007 | Senay | |
| 7,233,956 B2 | 6/2007 | Balducci et al. | |
| 7,250,951 B1 | 7/2007 | Hurley et al. | |
| 7,260,597 B1 | 8/2007 | Hofrichter et al. | |
| 7,263,663 B2 | 8/2007 | Ballard et al. | |
| 7,265,752 B2 | 9/2007 | Sander et al. | |
| 7,272,815 B1 | 9/2007 | Eldridge et al. | |
| 7,272,817 B1 | 9/2007 | Hinkle et al. | |
| 7,299,222 B1 | 11/2007 | Hogan et al. | |
| 7,307,640 B2 | 12/2007 | Demers et al. | |
| 7,315,305 B2 | 1/2008 | Crotty et al. | |
| 7,315,861 B2 | 1/2008 | Seibel et al. | |
| 7,334,222 B2 | 2/2008 | Keller | |
| 7,337,158 B2 | 2/2008 | Fratkina et al. | |
| 7,343,585 B1 | 3/2008 | Lau et al. | |
| 7,349,947 B1 | 3/2008 | Slage et al. | |
| 7,360,171 B2 | 4/2008 | Ruthfield et al. | |
| 7,365,311 B1 | 4/2008 | Cetto | |
| 7,379,935 B1 | 5/2008 | Mitra et al. | |
| 7,386,545 B2 | 6/2008 | Ashutosh et al. | |
| 7,392,312 B1 | 6/2008 | Philyaw | |
| 7,415,474 B1 | 8/2008 | Mitra et al. | |
| 7,437,349 B2 | 10/2008 | Basu et al. | |
| 7,440,902 B2 | 10/2008 | Greenstein et al. | |
| 7,486,292 B2 | 2/2009 | Itoh et al. | |
| 7,490,154 B2 | 2/2009 | Colby et al. | |
| 7,499,764 B2 | 3/2009 | Fukui | |
| 7,506,243 B2 | 3/2009 | Kotler et al. | |
| 7,526,425 B2 | 4/2009 | Marchisio et al. | |
| 7,530,020 B2 | 5/2009 | Szabo | |
| 7,546,287 B2 | 6/2009 | Subramaniam et al. | |
| 7,559,039 B2 | 7/2009 | Ridgley et al. | |
| 7,574,336 B1 | 8/2009 | Jackson et al. | |
| 7,574,659 B2 | 8/2009 | Szabo | |
| 7,603,620 B2 | 10/2009 | Erol et al. | |
| 7,617,202 B2 | 11/2009 | Brill et al. | |
| 7,617,315 B2 | 11/2009 | Black et al. | |
| 7,634,474 B2 | 12/2009 | Vassilvitskii et al. | |

(56) References Cited

U.S. PATENT DOCUMENTS

| | | | |
|---|---|---|---|
| 7,644,134 B2 | 1/2010 | Cohen et al. | |
| 7,647,306 B2 | 1/2010 | Rose et al. | |
| 7,657,522 B1 | 2/2010 | Puzicha et al. | |
| 7,672,950 B2 | 3/2010 | Eckard et al. | |
| 7,685,141 B2 | 3/2010 | Jadhav et al. | |
| 7,739,343 B2 | 6/2010 | Gardner et al. | |
| 7,752,314 B2 | 7/2010 | Trevor et al. | |
| 7,752,536 B2 | 7/2010 | Megiddo et al. | |
| 7,761,436 B2 | 7/2010 | Norton et al. | |
| 7,765,175 B2 | 7/2010 | Crandall et al. | |
| 7,765,236 B2 | 7/2010 | Zhai et al. | |
| 7,769,740 B2 | 8/2010 | Martinez et al. | |
| 7,802,230 B1 | 9/2010 | Mendicino et al. | |
| 7,814,085 B1 | 10/2010 | Pfleger et al. | |
| 7,817,150 B2 | 10/2010 | Reichard et al. | |
| 7,818,315 B2 | 10/2010 | Cucerzan et al. | |
| 7,831,608 B2 | 11/2010 | Aizenbud-Reshef et al. | |
| 7,873,946 B2 | 1/2011 | Lathrop et al. | |
| 7,900,111 B1 | 3/2011 | Kim et al. | |
| 7,908,186 B2 | 3/2011 | Gabelmann et al. | |
| 7,912,807 B2 | 3/2011 | McLean et al. | |
| 7,956,290 B2 | 6/2011 | Wang | |
| 7,973,786 B2 | 7/2011 | Gyorfi et al. | |
| 7,984,043 B1 | 7/2011 | Waas | |
| 8,024,331 B2 | 9/2011 | Calistri-Yeh et al. | |
| 8,117,145 B2 | 2/2012 | Rubin et al. | |
| 8,135,655 B2 | 3/2012 | Oaten et al. | |
| 8,145,618 B1 | 3/2012 | Pfleger et al. | |
| 8,155,931 B2 | 4/2012 | Rubin et al. | |
| 8,224,857 B2 | 7/2012 | Doganata et al. | |
| 8,244,766 B2 | 8/2012 | Mital et al. | |
| 8,255,192 B2 | 8/2012 | Rubin et al. | |
| 8,301,585 B2 | 10/2012 | Mourey et al. | |
| 8,332,772 B2 | 12/2012 | Janzen et al. | |
| 8,411,085 B2 | 4/2013 | Rubin et al. | |
| 8,473,473 B2 | 6/2013 | Wang et al. | |
| 8,538,898 B2 | 9/2013 | Lu et al. | |
| 8,589,172 B2 | 11/2013 | Alonso et al. | |
| 8,620,635 B2 | 12/2013 | Rubin et al. | |
| 8,627,270 B2 | 1/2014 | Fox et al. | |
| 8,635,061 B2 | 1/2014 | Li et al. | |
| 8,635,211 B2 | 1/2014 | Jiang et al. | |
| 8,635,251 B1 | 1/2014 | Chan | |
| 8,700,592 B2 | 4/2014 | Kanduri et al. | |
| 8,868,538 B2 | 10/2014 | Mital et al. | |
| 8,938,218 B2 * | 1/2015 | Pande | A01B 79/005 455/406 |
| 8,965,907 B2 | 2/2015 | Mital et al. | |
| 9,043,296 B2 * | 5/2015 | Mital | G06F 17/27 707/705 |
| 9,355,179 B2 | 5/2016 | Kuo et al. | |
| 9,484,046 B2 * | 11/2016 | Knudson | G06F 3/04842 |
| 10,180,339 B1 * | 1/2019 | Long | H04L 67/125 |
| 2001/0047372 A1 | 11/2001 | Gorelik et al. | |
| 2001/0049695 A1 | 12/2001 | Chi et al. | |
| 2002/0010571 A1 | 1/2002 | Daniel et al. | |
| 2002/0065673 A1 | 5/2002 | Rooke | |
| 2002/0066782 A1 | 6/2002 | Swaminathan et al. | |
| 2002/0070953 A1 | 6/2002 | Barg et al. | |
| 2002/0073058 A1 | 6/2002 | Kremer et al. | |
| 2002/0078086 A1 | 6/2002 | Alden et al. | |
| 2002/0083025 A1 | 6/2002 | Robarts et al. | |
| 2002/0091609 A1 | 7/2002 | Markowski | |
| 2002/0107853 A1 | 8/2002 | Hofmann et al. | |
| 2002/0140745 A1 | 10/2002 | Ellenby et al. | |
| 2002/0143800 A1 | 10/2002 | Lindberg et al. | |
| 2002/0145623 A1 | 10/2002 | Decombe | |
| 2002/0169658 A1 | 11/2002 | Adler | |
| 2002/0174096 A1 | 11/2002 | O'Reilly et al. | |
| 2002/0183995 A1 | 12/2002 | Veitch et al. | |
| 2002/0191199 A1 | 12/2002 | Imada et al. | |
| 2002/0194187 A1 | 12/2002 | Mcneil et al. | |
| 2002/0194201 A1 | 12/2002 | Wilbanks et al. | |
| 2003/0040962 A1 | 2/2003 | Lewis | |
| 2003/0041104 A1 | 2/2003 | Wingard et al. | |
| 2003/0103089 A1 | 6/2003 | Ramani et al. | |
| 2003/0144868 A1 | 7/2003 | Macintyre et al. | |
| 2003/0146939 A1 | 8/2003 | Petropoulos et al. | |
| 2003/0220913 A1 | 11/2003 | Doganata et al. | |
| 2004/0015481 A1 | 1/2004 | Zinda | |
| 2004/0015783 A1 | 1/2004 | Lennon et al. | |
| 2004/0075677 A1 | 4/2004 | Loyall et al. | |
| 2004/0075697 A1 | 4/2004 | Maudlin | |
| 2004/0080536 A1 | 4/2004 | Yakhini et al. | |
| 2004/0083211 A1 | 4/2004 | Bradford | |
| 2004/0098358 A1 | 5/2004 | Roediger | |
| 2004/0114258 A1 | 6/2004 | Harris et al. | |
| 2004/0133369 A1 * | 7/2004 | Pack | G03F 1/84 702/59 |
| 2004/0153992 A1 | 8/2004 | Molina-moreno et al. | |
| 2004/0154000 A1 | 8/2004 | Kasravi et al. | |
| 2004/0162842 A1 | 8/2004 | Ono et al. | |
| 2004/0163039 A1 | 8/2004 | Gorman | |
| 2004/0181519 A1 | 9/2004 | Anwar | |
| 2004/0189702 A1 | 9/2004 | Hlavac et al. | |
| 2004/0196287 A1 | 10/2004 | Wong et al. | |
| 2004/0197017 A1 * | 10/2004 | Olschewski | G06K 9/00127 382/128 |
| 2004/0221855 A1 | 11/2004 | Ashton | |
| 2004/0239494 A1 | 12/2004 | Kennedy et al. | |
| 2004/0246252 A1 | 12/2004 | Morrow et al. | |
| 2005/0004911 A1 | 1/2005 | Goldberg et al. | |
| 2005/0012743 A1 | 1/2005 | Kapler et al. | |
| 2005/0035883 A1 | 2/2005 | Kameda et al. | |
| 2005/0043961 A1 | 2/2005 | Torres et al. | |
| 2005/0055369 A1 | 3/2005 | Gorelik et al. | |
| 2005/0057560 A1 | 3/2005 | Bibr et al. | |
| 2005/0066281 A1 | 3/2005 | Abbott et al. | |
| 2005/0071328 A1 | 3/2005 | Lawrence | |
| 2005/0081161 A1 | 4/2005 | Macinnes et al. | |
| 2005/0086243 A1 | 4/2005 | Abbott et al. | |
| 2005/0091584 A1 | 4/2005 | Bogdan et al. | |
| 2005/0094207 A1 | 5/2005 | Lo et al. | |
| 2005/0108256 A1 | 5/2005 | Wakefield et al. | |
| 2005/0120021 A1 | 6/2005 | Tang et al. | |
| 2005/0131657 A1 | 6/2005 | Sean Mei | |
| 2005/0131659 A1 | 6/2005 | Mei et al. | |
| 2005/0137921 A1 | 6/2005 | Shahriari | |
| 2005/0187809 A1 | 8/2005 | Falkenhainer | |
| 2005/0210024 A1 | 9/2005 | Hurst-hiller et al. | |
| 2005/0210054 A1 | 9/2005 | Harris | |
| 2005/0222977 A1 | 10/2005 | Zhou et al. | |
| 2005/0231392 A1 | 10/2005 | Meehan et al. | |
| 2005/0275622 A1 | 12/2005 | Patel et al. | |
| 2006/0005124 A1 | 1/2006 | Speicher | |
| 2006/0020523 A1 | 1/2006 | Song | |
| 2006/0020593 A1 | 1/2006 | Ramsaier et al. | |
| 2006/0047673 A1 | 3/2006 | Molander et al. | |
| 2006/0055696 A1 | 3/2006 | Loberg | |
| 2006/0064411 A1 | 3/2006 | Gross et al. | |
| 2006/0066632 A1 | 3/2006 | Wong et al. | |
| 2006/0074882 A1 | 4/2006 | Scherer et al. | |
| 2006/0080400 A1 | 4/2006 | Guha | |
| 2006/0080594 A1 | 4/2006 | Chavoustie et al. | |
| 2006/0106793 A1 | 5/2006 | Liang | |
| 2006/0107211 A1 | 5/2006 | Mirtich et al. | |
| 2006/0107234 A1 | 5/2006 | Tudor et al. | |
| 2006/0112079 A1 | 5/2006 | Holt et al. | |
| 2006/0112123 A1 | 5/2006 | Clark et al. | |
| 2006/0117067 A1 | 6/2006 | Wright et al. | |
| 2006/0117303 A1 | 6/2006 | Gizinski | |
| 2006/0136280 A1 | 6/2006 | Cho et al. | |
| 2006/0136393 A1 | 6/2006 | Abbott et al. | |
| 2006/0136405 A1 | 6/2006 | Ducatel et al. | |
| 2006/0139375 A1 | 6/2006 | Rasmussen et al. | |
| 2006/0156252 A1 | 7/2006 | Sheshagiri et al. | |
| 2006/0210024 A1 | 9/2006 | Qiu | |
| 2006/0212362 A1 | 9/2006 | Donsbach et al. | |
| 2006/0221077 A1 | 10/2006 | Wright et al. | |
| 2006/0224579 A1 | 10/2006 | Zheng | |
| 2006/0253245 A1 | 11/2006 | Cera et al. | |
| 2006/0265397 A1 | 11/2006 | Bryan et al. | |
| 2006/0271581 A1 | 11/2006 | Sanjar et al. | |
| 2006/0288023 A1 | 12/2006 | Szabo | |

(56) References Cited

U.S. PATENT DOCUMENTS

| | | |
|---|---|---|
| 2006/0294509 A1 | 12/2006 | Mital et al. |
| 2007/0005477 A1 | 1/2007 | Mcatamney |
| 2007/0005534 A1 | 1/2007 | Sabato et al. |
| 2007/0006078 A1 | 1/2007 | Jewsbury et al. |
| 2007/0010901 A1 | 1/2007 | Fukui |
| 2007/0011134 A1 | 1/2007 | Langseth et al. |
| 2007/0016873 A1 | 1/2007 | Lindsay |
| 2007/0022380 A1 | 1/2007 | Swartz et al. |
| 2007/0022384 A1 | 1/2007 | Abbott et al. |
| 2007/0033443 A1 | 2/2007 | Tillmann et al. |
| 2007/0038616 A1 | 2/2007 | Guha |
| 2007/0038657 A1 | 2/2007 | Denton et al. |
| 2007/0043694 A1 | 2/2007 | Sawafta et al. |
| 2007/0046664 A1 | 3/2007 | Raspl et al. |
| 2007/0060785 A1* | 3/2007 | Freeman ............ A61H 31/00 600/16 |
| 2007/0061711 A1 | 3/2007 | Bodin et al. |
| 2007/0078842 A1 | 4/2007 | Zola et al. |
| 2007/0094171 A1 | 4/2007 | Burges et al. |
| 2007/0112714 A1 | 5/2007 | Fairweather |
| 2007/0118498 A1 | 5/2007 | Song et al. |
| 2007/0124283 A1 | 5/2007 | Gotts et al. |
| 2007/0124285 A1 | 5/2007 | Wright et al. |
| 2007/0136326 A1 | 6/2007 | Mcclement et al. |
| 2007/0136406 A1 | 6/2007 | Softky |
| 2007/0141541 A1 | 6/2007 | Chan et al. |
| 2007/0150597 A1 | 6/2007 | Hasan et al. |
| 2007/0156677 A1 | 7/2007 | Szabo |
| 2007/0162866 A1 | 7/2007 | Matthews et al. |
| 2007/0168454 A1 | 7/2007 | Ben-yehuda et al. |
| 2007/0179941 A1 | 8/2007 | Huang et al. |
| 2007/0185746 A1 | 8/2007 | Chieu et al. |
| 2007/0188494 A1 | 8/2007 | Agutter et al. |
| 2007/0220411 A1 | 9/2007 | Hauser |
| 2007/0220415 A1 | 9/2007 | Cheng et al. |
| 2007/0233656 A1 | 10/2007 | Bunescu et al. |
| 2007/0242082 A1 | 10/2007 | Lathrop et al. |
| 2007/0244910 A1 | 10/2007 | Mital et al. |
| 2007/0250764 A1 | 10/2007 | Jiang |
| 2007/0265995 A1 | 11/2007 | Remington et al. |
| 2007/0271207 A1 | 11/2007 | Copty et al. |
| 2007/0271508 A1 | 11/2007 | Audet |
| 2007/0277111 A1 | 11/2007 | Bennett et al. |
| 2007/0279416 A1 | 12/2007 | Cobb et al. |
| 2007/0282809 A1 | 12/2007 | Hoeber et al. |
| 2007/0294196 A1 | 12/2007 | Musuvathi et al. |
| 2007/0294614 A1 | 12/2007 | Jacquin et al. |
| 2008/0005118 A1 | 1/2008 | Shakib et al. |
| 2008/0010041 A1 | 1/2008 | Mcdaniel |
| 2008/0015823 A1 | 1/2008 | Arnold et al. |
| 2008/0027921 A1 | 1/2008 | Chandrasekar et al. |
| 2008/0033970 A1 | 2/2008 | Jones et al. |
| 2008/0040346 A1 | 2/2008 | Aggarwal et al. |
| 2008/0058969 A1 | 3/2008 | Nixon et al. |
| 2008/0059486 A1 | 3/2008 | Pappas |
| 2008/0059889 A1 | 3/2008 | Parker et al. |
| 2008/0059909 A1 | 3/2008 | Parada et al. |
| 2008/0062167 A1 | 3/2008 | Boggs et al. |
| 2008/0082506 A1 | 4/2008 | Saito et al. |
| 2008/0082667 A1 | 4/2008 | Meijer et al. |
| 2008/0104004 A1 | 5/2008 | Brave et al. |
| 2008/0104047 A1 | 5/2008 | Nagarajayya |
| 2008/0104118 A1 | 5/2008 | Pulfer et al. |
| 2008/0115049 A1 | 5/2008 | Tolle et al. |
| 2008/0115082 A1 | 5/2008 | Simmons et al. |
| 2008/0120296 A1 | 5/2008 | Kariathungal et al. |
| 2008/0133505 A1 | 6/2008 | Bayley et al. |
| 2008/0147775 A1 | 6/2008 | Abbott et al. |
| 2008/0152231 A1 | 6/2008 | Gokturk et al. |
| 2008/0172360 A1 | 7/2008 | Lim et al. |
| 2008/0178083 A1 | 7/2008 | Bergman et al. |
| 2008/0183710 A1 | 7/2008 | Serjeantson et al. |
| 2008/0184140 A1 | 7/2008 | Koerner |
| 2008/0184167 A1 | 7/2008 | Berrill et al. |
| 2008/0189235 A1 | 8/2008 | Mital et al. |
| 2008/0189438 A1 | 8/2008 | Zimmerer et al. |
| 2008/0192056 A1 | 8/2008 | Robertson et al. |
| 2008/0195930 A1 | 8/2008 | Tolle |
| 2008/0196025 A1 | 8/2008 | Meijer et al. |
| 2008/0201338 A1 | 8/2008 | Castro et al. |
| 2008/0209314 A1 | 8/2008 | Sylthe et al. |
| 2008/0215543 A1 | 9/2008 | Huang et al. |
| 2008/0215559 A1 | 9/2008 | Fontoura et al. |
| 2008/0218531 A1 | 9/2008 | Chou et al. |
| 2008/0221487 A1 | 9/2008 | Zohar et al. |
| 2008/0222105 A1 | 9/2008 | Matheny |
| 2008/0238925 A1 | 10/2008 | Meehan et al. |
| 2008/0243823 A1 | 10/2008 | Baris et al. |
| 2008/0263468 A1 | 10/2008 | Cappione et al. |
| 2008/0271127 A1 | 10/2008 | Naibo et al. |
| 2008/0281824 A1 | 11/2008 | Rangadass et al. |
| 2008/0288482 A1 | 11/2008 | Chaudhuri et al. |
| 2008/0288889 A1 | 11/2008 | Hunt et al. |
| 2008/0294996 A1 | 11/2008 | Hunt et al. |
| 2008/0306808 A1 | 12/2008 | Adjali et al. |
| 2008/0306981 A1 | 12/2008 | Jiang et al. |
| 2008/0307334 A1 | 12/2008 | Chaudhri et al. |
| 2008/0313144 A1 | 12/2008 | Huston |
| 2008/0319829 A1 | 12/2008 | Hunt et al. |
| 2009/0006318 A1 | 1/2009 | Lehtipalo et al. |
| 2009/0013270 A1 | 1/2009 | Helfman et al. |
| 2009/0019015 A1 | 1/2009 | Hijikata |
| 2009/0019369 A1 | 1/2009 | Borovsky et al. |
| 2009/0024553 A1 | 1/2009 | Angell et al. |
| 2009/0037363 A1 | 2/2009 | Kozlov et al. |
| 2009/0037474 A1 | 2/2009 | Faulkner et al. |
| 2009/0043738 A1 | 2/2009 | James et al. |
| 2009/0049422 A1 | 2/2009 | Hage et al. |
| 2009/0077033 A1 | 3/2009 | Mcgary et al. |
| 2009/0089083 A1 | 4/2009 | Paradis et al. |
| 2009/0094227 A1* | 4/2009 | Berkowitz .......... G06F 17/3064 |
| 2009/0094557 A1 | 4/2009 | Howard |
| 2009/0094674 A1 | 4/2009 | Schwartz et al. |
| 2009/0100360 A1 | 4/2009 | Janzen et al. |
| 2009/0100407 A1 | 4/2009 | Bouillet et al. |
| 2009/0106232 A1 | 4/2009 | Burges et al. |
| 2009/0112975 A1 | 4/2009 | Beckman et al. |
| 2009/0113346 A1 | 4/2009 | Wickramasuriya et al. |
| 2009/0125482 A1 | 5/2009 | Peregrine et al. |
| 2009/0125553 A1 | 5/2009 | Dickinson |
| 2009/0144609 A1 | 6/2009 | Liang et al. |
| 2009/0171813 A1 | 7/2009 | Byrne et al. |
| 2009/0172024 A1 | 7/2009 | Hsu et al. |
| 2009/0172553 A1 | 7/2009 | Sikka et al. |
| 2009/0172773 A1 | 7/2009 | Moore |
| 2009/0182622 A1 | 7/2009 | Agarwal et al. |
| 2009/0182725 A1 | 7/2009 | Govani et al. |
| 2009/0187516 A1 | 7/2009 | Kanungo et al. |
| 2009/0210388 A1 | 8/2009 | Elson et al. |
| 2009/0216757 A1 | 8/2009 | Sen et al. |
| 2009/0216758 A1 | 8/2009 | Tuttle et al. |
| 2009/0219284 A1 | 9/2009 | Maillot et al. |
| 2009/0222388 A1* | 9/2009 | Hua .................. G06N 5/02 706/12 |
| 2009/0225082 A1 | 9/2009 | Hargrove et al. |
| 2009/0228828 A1 | 9/2009 | Beatty et al. |
| 2009/0234909 A1 | 9/2009 | Strandell et al. |
| 2009/0239552 A1 | 9/2009 | Churchill et al. |
| 2009/0254971 A1 | 10/2009 | Herz et al. |
| 2009/0265338 A1* | 10/2009 | Kraft ................ G06F 16/951 |
| 2009/0271724 A1 | 10/2009 | Chaudhri et al. |
| 2009/0287683 A1 | 11/2009 | Bennett |
| 2009/0287685 A1 | 11/2009 | Charnock et al. |
| 2009/0287814 A1 | 11/2009 | Robertson et al. |
| 2009/0300544 A1 | 12/2009 | Psenka et al. |
| 2009/0307162 A1 | 12/2009 | Bui et al. |
| 2009/0312992 A1 | 12/2009 | Chen et al. |
| 2009/0319507 A1 | 12/2009 | Chen et al. |
| 2009/0319508 A1 | 12/2009 | Yih et al. |
| 2009/0322739 A1 | 12/2009 | Rubin et al. |
| 2009/0322743 A1 | 12/2009 | Rubin et al. |
| 2009/0326872 A1 | 12/2009 | Rubin et al. |
| 2009/0326885 A1 | 12/2009 | Rubin et al. |
| 2009/0326919 A1 | 12/2009 | Bean |

(56) References Cited

U.S. PATENT DOCUMENTS

| | | |
|---|---|---|
| 2009/0326947 A1 | 12/2009 | Arnold et al. |
| 2009/0327183 A1 | 12/2009 | Rubin et al. |
| 2009/0327878 A1 | 12/2009 | Grandison et al. |
| 2010/0005420 A1 | 1/2010 | Schneider |
| 2010/0011025 A1 | 1/2010 | Zheng et al. |
| 2010/0011309 A1 | 1/2010 | Mitra et al. |
| 2010/0030740 A1 | 2/2010 | Higgins et al. |
| 2010/0049686 A1 | 2/2010 | Gotz et al. |
| 2010/0050211 A1 | 2/2010 | Seldin et al. |
| 2010/0057753 A1 | 3/2010 | Gotz et al. |
| 2010/0070448 A1* | 3/2010 | Omoigui ............. H01L 27/1463 706/47 |
| 2010/0070489 A1 | 3/2010 | Aymeloglu et al. |
| 2010/0079336 A1 | 4/2010 | Skibiski et al. |
| 2010/0088258 A1 | 4/2010 | Oaten et al. |
| 2010/0098343 A1 | 4/2010 | Perronnin et al. |
| 2010/0100405 A1 | 4/2010 | Lepore et al. |
| 2010/0100561 A1 | 4/2010 | Cooper et al. |
| 2010/0106853 A1 | 4/2010 | Kashiyama et al. |
| 2010/0118026 A1 | 5/2010 | Demchak et al. |
| 2010/0122174 A1 | 5/2010 | Snibbe et al. |
| 2010/0131248 A1 | 5/2010 | Green et al. |
| 2010/0131254 A1 | 5/2010 | Rubin et al. |
| 2010/0131255 A1 | 5/2010 | Beckman et al. |
| 2010/0131546 A1 | 5/2010 | Mital et al. |
| 2010/0138753 A1 | 6/2010 | Riggs et al. |
| 2010/0145976 A1 | 6/2010 | Higgins et al. |
| 2010/0156900 A1 | 6/2010 | Beckman et al. |
| 2010/0174754 A1 | 7/2010 | B'far et al. |
| 2010/0179874 A1 | 7/2010 | Higgins et al. |
| 2010/0179951 A1 | 7/2010 | Mcphail |
| 2010/0198697 A1 | 8/2010 | Brown et al. |
| 2010/0198837 A1 | 8/2010 | Wu et al. |
| 2010/0199181 A1 | 8/2010 | Robertson et al. |
| 2010/0205178 A1 | 8/2010 | Bush et al. |
| 2010/0205238 A1 | 8/2010 | Cao et al. |
| 2010/0235340 A1 | 9/2010 | Todhunter et al. |
| 2010/0241620 A1 | 9/2010 | Manister et al. |
| 2010/0250527 A1 | 9/2010 | Gnanamani et al. |
| 2010/0250931 A1 | 9/2010 | Andersen et al. |
| 2010/0287459 A1 | 11/2010 | Mital et al. |
| 2010/0293195 A1 | 11/2010 | Houghton |
| 2010/0312545 A1 | 12/2010 | Sites |
| 2010/0321391 A1 | 12/2010 | Rubin et al. |
| 2010/0321407 A1 | 12/2010 | Mital et al. |
| 2010/0324867 A1 | 12/2010 | Mital et al. |
| 2010/0324870 A1 | 12/2010 | Beckman et al. |
| 2010/0325166 A1 | 12/2010 | Rubin et al. |
| 2010/0325196 A1 | 12/2010 | Beckman et al. |
| 2010/0325564 A1 | 12/2010 | Mital et al. |
| 2010/0325578 A1 | 12/2010 | Mital et al. |
| 2011/0004524 A1* | 1/2011 | Paul ....................... G06Q 30/02 705/14.58 |
| 2011/0004529 A2 | 1/2011 | Finn et al. |
| 2011/0004609 A1 | 1/2011 | Chitiveli et al. |
| 2011/0029636 A1 | 2/2011 | Smyth et al. |
| 2011/0040753 A1 | 2/2011 | Knight |
| 2011/0060704 A1 | 3/2011 | Rubin et al. |
| 2011/0072046 A1 | 3/2011 | Chi |
| 2011/0078101 A1 | 3/2011 | Gotz et al. |
| 2011/0078160 A1 | 3/2011 | Gotz et al. |
| 2011/0078553 A1 | 3/2011 | Reimann et al. |
| 2011/0078554 A1 | 3/2011 | Nie et al. |
| 2011/0093430 A1 | 4/2011 | B'far et al. |
| 2011/0103699 A1 | 5/2011 | Ke et al. |
| 2011/0106782 A1 | 5/2011 | Ke et al. |
| 2011/0106798 A1 | 5/2011 | Li et al. |
| 2011/0106836 A1 | 5/2011 | Hassanzadeh et al. |
| 2011/0119270 A1 | 5/2011 | Jin et al. |
| 2011/0131253 A1 | 6/2011 | Peukert et al. |
| 2011/0137910 A1 | 6/2011 | Hibino et al. |
| 2011/0137932 A1 | 6/2011 | Wable |
| 2011/0179020 A1 | 7/2011 | Ozzie et al. |
| 2011/0208724 A1 | 8/2011 | Jones et al. |
| 2011/0225155 A1 | 9/2011 | Roulland et al. |
| 2011/0231385 A1 | 9/2011 | Wang et al. |
| 2011/0231797 A1 | 9/2011 | Huhtala et al. |
| 2011/0024654 A1 | 10/2011 | Katzenberger et al. |
| 2011/0242108 A1 | 10/2011 | Mital et al. |
| 2011/0246549 A1 | 10/2011 | Katzenberger et al. |
| 2011/0252012 A1 | 10/2011 | Kanduri et al. |
| 2011/0264526 A1 | 10/2011 | Mital et al. |
| 2011/0264642 A1 | 10/2011 | Mital et al. |
| 2011/0264645 A1 | 10/2011 | Mital et al. |
| 2011/0264665 A1 | 10/2011 | Mital et al. |
| 2011/0264678 A1 | 10/2011 | Mital et al. |
| 2011/0270628 A1 | 11/2011 | Mital et al. |
| 2011/0270674 A1 | 11/2011 | Cosman |
| 2011/0270864 A1 | 11/2011 | Mital et al. |
| 2011/0282861 A1 | 11/2011 | Bergstraesser et al. |
| 2011/0283205 A1 | 11/2011 | Nie et al. |
| 2011/0295775 A1 | 12/2011 | Wang et al. |
| 2011/0295795 A1 | 12/2011 | Venkatasubramanian et al. |
| 2011/0295853 A1 | 12/2011 | Li et al. |
| 2011/0299743 A1 | 12/2011 | Ke et al. |
| 2011/0314007 A1 | 12/2011 | Dassa et al. |
| 2011/0314400 A1 | 12/2011 | Mital et al. |
| 2012/0117051 A1 | 5/2012 | Liu et al. |
| 2012/0158643 A1 | 6/2012 | Mital et al. |
| 2012/0158644 A1 | 6/2012 | Mital et al. |
| 2012/0158732 A1 | 6/2012 | Mital et al. |
| 2012/0158754 A1 | 6/2012 | Mital et al. |
| 2012/0159312 A1 | 6/2012 | Mital et al. |
| 2012/0159333 A1 | 6/2012 | Mital et al. |
| 2012/0159465 A1 | 6/2012 | Mital et al. |
| 2012/0263386 A1 | 10/2012 | Schlosser et al. |
| 2012/0303664 A1 | 11/2012 | Apacible et al. |
| 2015/0248494 A1 | 9/2015 | Mital et al. |
| 2016/0086015 A1* | 3/2016 | Irmatov ............. G06K 9/00281 382/103 |

FOREIGN PATENT DOCUMENTS

| | | |
|---|---|---|
| CN | 1606008 A | 4/2005 |
| CN | 101247312 A | 8/2008 |
| CN | 102023800 A | 4/2011 |
| EP | 1069534 A2 | 1/2001 |
| GB | 2335761 A | 9/1999 |
| RU | 2288509 C1 | 11/2006 |
| WO | 2006099295 A2 | 9/2006 |
| WO | 2007079131 A2 | 7/2007 |
| WO | 2007113573 A2 | 10/2007 |
| WO | 2008037848 A1 | 4/2008 |
| WO | 2008078321 A2 | 7/2008 |
| WO | 2009052277 A1 | 4/2009 |
| WO | 2009154484 A2 | 12/2009 |
| WO | 2011054002 A2 | 5/2011 |
| WO | 2011143154 A2 | 11/2011 |

OTHER PUBLICATIONS

Purdue University, "Mobile Analytics—Interactive Visualization and Analysis of Network and Sensor Data on Mobile Devices", Oct. 31, 2006, PURVAC Purdue University Regional Visualization and Analytics Centers, United States.

United States Patent and Trademark Office, "Final Office Action dated Jun. 18, 2012 in U.S. Appl. No. 12/848,082", filed Jun. 18, 2012, United States.

United States Patent and Trademark Office, "Final Office Action dated Sep. 26, 2013 in U.S. Appl. No. 12/848,082", filed Sep. 26, 2013, United States.

United States Patent and Trademark Office, "Final Office Action dated Oct. 31, 2014 in U.S. Appl. No. 12/848,082", filed Oct. 31, 2014, United States.

United States Patent and Trademark Office, "Non-Final Office Action dated Jan. 31, 2014 in U.S. Appl. No. 12/848,082", filed Jan. 31, 2014, United States.

United States Patent and Trademark Office, "Non-Final Office Action dated Jul. 24, 2014 in U.S. Appl. No. 12/848,082", filed Jul. 24, 2014, United States.

(56) References Cited

OTHER PUBLICATIONS

United States Patent and Trademark Office, "Non-Final Office Action dated Apr. 24, 2013 in U.S. Appl. No. 12/848,082", filed Apr. 24, 2013, United States.
United States Patent and Trademark Office, "Non-Final Office Action dated Nov. 8, 2012 in U.S. Appl. No. 12/848,082", filed Nov. 8, 2012, United States.
United States Patent and Trademark Office, "Non-Final Office Action dated Jan. 19, 2012 in U.S. Appl. No. 12/848,082", filed Jan. 19, 2012, United States.
United States Patent and Trademark Office, "Notice of Allowance dated Jan. 26, 2015 in U.S. Appl. No. 12/848,082", filed Jan. 26, 2015, United States.
Coutinho, et al.,"Active Catalogs: Integrated Support for Component Engineering", Proceedings of ASME Design Engineering Technical Conference, Sep. 13, 1998.
Ghose, et al., "An Empirical Analysis of Search Engine Advertising: Sponsored Search in Electronic Markets", Management Science, Oct. 2009, pp. 1605-1622, vol. 55, No. 10, INFORMS.
Goix, et al., "Situation Inference for Mobile Users: A Rule Based Approach", 2007 International Conference on Mobile Data Management, May 1, 2007, pp. 299-303, Institute of Electrical and Electronics Engineers.
Kraak, "Cartography and Geo-Information Science: An Integrated Approach", Eighth United Nations Regional Cartographic Conference for the Americas, Jun. 27-Jul. 1, 2005, vol. 27, International Institute of Geo-Information Science and Earth Observation, Netherlands.
Pu, et al., "Effective Interaction Principles for Online Product Search Environments", IEEE/WIC/ACM International Conference on Web Intelligence, Sep. 20-24, 2004, pp. 724-727, Institute of Electrical and Electronics Engineers.
Sashima, et al., "Consorts-S: A Mobile Sensing Platform for Context-Aware Services", International Conference on Intelligent Sensors, Sensor Networks and Information Processing, Dec. 15-18, 2008, pp. 417-422, Institute of Electrical and Electronics Engineers.
Smith, et al., "Slack-Based Heuristics for Constraint Satisfaction Scheduling", 11th National Conference on Artificial Intelligence, Jul. 1993, pp. 139-144, Association for the Advancement of Artificial Intelligence (AAAI-93) Press.
Uren, et al., "Semantic Search Components: A Blueprint for Effective Query Language Interfaces", Managing Knowledge in a World of Networks, 2006, pp. 222-237, Springer Berlin Heidelberg.
Vallet, et al., "Inferring the Most Important Types of a Query: a Semantic Approach", Proceedings of the 31st annual international ACM SIGIR conference on Research and development in information retrieval, 2008, pp. 857-858, ACM, United States.
Vassilvitskii, et al., "Using Web-Graph Distance for Relevance Feedback in Web Search", In Proceedings of the 29th Annual International ACM SIGIR Conference on Research and Development in Information Retrieval, 2006, pp. 147-153, ACM, United States.
Yu, et al., "A System for Web-Based Interactive Real-Time Data Visualization and Analysis", IEEE Conference on Commerce and Enterprise Computing, Jul. 20-23, 2009, pp. 453-459, Institute of Electrical and Electronics Engineers.
Zaki, et al., "Reasoning About Sets Using Redescription Mining", In Proceedings of the eleventh ACM SIGKDD international conference on Knowledge discovery in data mining, 2005, pp. 364-373, ACM, United States.
Zaragoza, et al., "Web Search Relevance Ranking", Available on the Internet: <<http://research.microsoft.com/pubs/102937/eds-websearchrelevanceranking.pdf>>, Sep. 2009, Springer Verlag.
Yu, "A System for Web-Based Interactive Real-Time Data Visualization and Analysis", 2009 IEEE Conference on Commerce and Enterprise Computing, Jul. 20-23, 2009, retrieved from the Internet: http://www.computer.org/portal/web/csdl/dio/10.11.1109/CEC.2009.26.
"Non Final Office Action Issued in U.S. Appl. No. 12/163,867", dated Mar. 26, 2012, 33 Pages.
"Non Final Office Action Issued in U.S. Appl. No. 12/163,867", dated May 3, 2011, 23 Pages.
"Final Office Action Issued in U.S. Appl. No. 12/163,872", dated Mar. 1, 2011, 14 Pages.
"Final Office Action Issued in U.S. Appl. No. 12/163,872", dated Jan. 13, 2012, 19 Pages.
"Non Final Office Action Issued in U.S. Appl. No. 12/163,872", dated Aug. 3, 2011, 16 Pages.
"Non Final Office Action Issued in U.S. Appl. No. 12/163,872", dated Nov. 12, 2010, 14 Pages.
"Final Office Action Issued in U.S. Appl. No. 12/163,957", dated Nov. 19, 2012, 42 Pages.
"Final Office Action Issued in U.S. Appl. No. 12/163,957", dated Nov. 9, 2011, 32 Pages.
"Final Office Action Issued in U.S. Appl. No. 12/163,957", dated Oct. 1, 2013, 30 Pages.
"Non Final Office Action Issued in U.S. Appl. No. 12/163,957", dated May 20, 2013, 35 Pages.
"Non Final Office Action Issued in U.S. Appl. No. 12/163,957", dated Jun. 15, 2012, 54 Pages.
"Non Final Office Action Issued in U.S. Appl. No. 12/163,957", dated Jul. 5, 2011, 26 Pages.
"Non Final Office Action Issued in U.S. Appl. No. 12/324,462", dated Jun. 9, 2011, 20 Pages.
"Final Office Action Issued in U.S. Appl. No. 12/324,469", dated Jul. 21, 2011, 13 Pages.
"Non Final Office Action Issued in U.S. Appl. No. 12/324,469", dated Feb. 22, 2011, 32 Pages.
"Non Final Office Action Issued in U.S. Appl. No. 12/324,480", dated Sep. 7, 2011, 09 Pages.
"Final Office Action Issued in U.S. Appl. No. 12/344,215", dated Oct. 31, 2011, 20 Pages.
"Non Final Office Action Issued in U.S. Appl. No. 12/344,215", dated Mar. 2, 2012, 19 Pages.
"Non Final Office Action Issued in U.S. Appl. No. 12/344,215", dated Aug. 16, 2011, 17 Pages.
"Final Office Action Issued in U.S. Appl. No. 12/488,201", dated Nov. 29, 2012, 40 Pages.
"Non Final Office Action Issued in U.S. Appl. No. 12/488,201", dated May 1, 2012, 15 Pages.
"Final Office Action Issued in U.S. Appl. No. 12/488,213", dated Jun. 7, 2012, 44 Pages.
"Non Final Office Action Issued in U.S. Appl. No. 12/488,213", dated Feb. 1, 2012, 10 Pages.
"Non Final Office Action Issued in U.S. Appl. No. 12/488,213", dated Sep. 19, 2013, 25 Pages.
"Non Final Office Action Issued in U.S. Appl. No. 12/488,219", dated Jan. 26, 2012, 26 Pages.
"Non Final Office Action Issued in U.S. Appl. No. 12/488,219", dated Jan. 5, 2012, 12 Pages.
"Final Office Action Issued in U.S. Appl. No. 12/488,247", dated Dec. 28, 2012, 22 Pages.
"Non Final Office Action Issued in U.S. Appl. No. 12/488,247", dated Jul. 25, 2012, 33 Pages.
"Final Office Action Issued in U.S. Appl. No. 12/488,292", dated Nov. 29, 2013, 6 Pages.
"Non Final Office Action Issued in U.S. Appl. No. 12/488,292", dated May 17, 2012, 16 Pages.
"Non Final Office Action Issued in U.S. Appl. No. 12/488,295", dated Jul. 12, 2012, 38 Pages.
"Final Office Action Issued in U.S. Appl. No. 12/488,300", dated Jan. 16, 2013, 19 Pages.
"Non Final Office Action Issued in U.S. Appl. No. 12/488,300", dated Aug. 1, 2012, 22 Pages.
"Final Office Action Issued in U.S. Appl. No. 12/488,314", dated Jun. 13, 2012, 33 Pages.
"Non Final Office Action Issued in U.S. Appl. No. 12/488,314", dated Jan. 5, 2012, 13 Pages.
"Non Final Office Action Issued in U.S. Appl. No. 12/488,314", dated Sep. 18, 2013, 15 Pages.
"Final Office Action Issued in U.S. Appl. No. 12/751,866", dated Apr. 12, 2018, 22 Pages.

(56) References Cited

OTHER PUBLICATIONS

"Final Office Action Issued in U.S. Appl. No. 12/752,961", dated Dec. 31, 2013, 15 Pages.
"Final Office Action Issued in U.S. Appl. No. 12/752,961", dated Nov. 20, 2012, 16 Pages.
"Non Final Office Action Issued in U.S. Appl. No. 12/752,961", dated Jun. 21, 2012, 12 Pages.
"Non Final Office Action Issued in U.S. Appl. No. 12/752,961", dated May 15, 2013, 15 Pages.
"Non Final Office Action Issued in U.S. Appl. No. 12/759,097", dated Nov. 30, 2011, 13 Pages.
"Final Office Action Issued in U.S. Appl. No. 12/765,408", dated Dec. 21, 2012, 23 Pages.
"Final Office Action Issued in U.S. Appl. No. 12/765,408", dated Feb. 29, 2016, 43 Pages.
"Final Office Action Issued in U.S. Appl. No. 12/765,408", dated Feb. 14, 2017, 20 Pages.
"Non Final Office Action Issued in U.S. Appl. No. 12/765,408", dated Aug. 30, 2016, 55 Pages.
"Non Final Office Action Issued in U.S. Appl. No. 12/765,408", dated Sep. 26, 2014, 21 Pages.
"Non Final Office Action Issued in U.S. Appl. No. 12/765,408", dated Jun. 25, 2012, 34 Pages.
"Final office action received for U.S. Appl. No. 12/765,465", dated Nov. 19, 2012, 24 Pages.
"Non Final Office Action Issued in U.S. Appl. No. 12/765,465", dated Apr. 30, 2012, 26 Pages.
"Final Office Action received for U.S. Appl. No. 12/971,782", dated Dec. 4, 2014, 13 Pages.
"Non-Final Office Action Issued in U.S. Appl. No. 12/971,782", dated Apr. 10, 2014, 11 Pages.
"Non-Final Office Action received for U.S. Appl. No. 12/971,782", dated Jul. 13, 2012, 8 Pages.
"Final Office Action Received for U.S. Appl. No. 12/972,144", dated Nov. 20, 2013, 29 Pages.
"Non-Final Office Action Received for U.S. Appl. No. 12/972,144", dated Jun. 9, 2014, 16 Pages.
"Non-Final Office Action Received for U.S. Appl. No. 12/972,144", dated Jan. 14, 2013, 23 Pages.
"Non-Final Office Action Received for U.S. Appl. No. 12/972,144", dated Jul. 9, 2013, 26 Pages.
"Final Office Action received for U.S. Appl. No. 12/972,205", dated Jun. 7, 2013, 35 Pages.
"Non-Final Office Action received for U.S. Appl. No. 12/972,205", dated Nov. 26, 2012, 33 Pages.
"Final Office Action Issued in U.S. Appl. No. 14/790,336", dated Jul. 29, 2016, 14 Pages.
"Fifth Office Action Issued in Chinese Patent Application No. 200980125849.9", dated Apr. 15, 2014, 06 Pages.
"First Office Action Issued in Chinese Patent Application No. 200980125849.9", dated Jul. 2, 2012, 06 Pages.
"Fourth Office Action Issued in Chinese Patent Application No. 200980125849.9", dated Nov. 20, 2013, 06 Pages.
"Second Office Action Issued in Chinese Patent Application No. 200980125849.9", dated Mar. 12, 2013, 06 Pages.
"Third Office Action Issued in Chinese Patent Application No. 200980125849.9", dated Aug. 2, 2013, 08 Pages.
"First Office Action Issued in Chinese Patent Application No. 201110100113.5", dated Apr. 1, 2015, 15 Pages.
"Second Office Action Issued in Chinese Patent Application No. 201110100113.5", dated Nov. 19, 2015, 6 Pages.
"Office Action Received for Chinese Patent Application No. 201110128855.9", dated Jun. 3, 2015, 10 Pages.
"Second Office Action Received for Chinese Patent Application No. 201110128855.9", dated Feb. 2, 2016, 6 Pages.
"First Office Action Issued in Chinese Patent application No. 201180020014.4", dated Jul. 2, 2015, 10 Pages.
"Second Office Action Issued in Chinese Patent Application No. 201180020014.4", dated Mar. 4, 2016, 6 Pages.

Adeel, et al., "Math Go! Prototype of a Content Based Mathematical Formula Search Engine", In Journal of Theoretical & Applied Information Technology, Oct. 1, 2008, pp. 1002-1012.
Aigner, et al., "Introduction to Visual Analytics", In Thesis Submitted to Department of Information and Knowledge Engineering, Danube University Krems, 2007, 04 Pages.
Aleman-Meza, et al., "Ranking Complex Relationships on the Semantic Web", In IEEE Internet Computing, vol. 9, Issue 3, May, 2005, pp. 37-44.
Alexander, Repenning, "AgentSheets: An Interactive Simulation Environment with End-User Programmable Agents", Available at: http://citeseerx.ist.psu.edu/viewdoc/download?doi=10.1.1.36.2039&rep=rep1&type=pdf, 2000, 8 Pages.
Ayachit, et al., "Customizing ParaView", http://www.itk.org/Wiki/images/7/77/Branding_paper.pdf, Oct. 2009, 3 Pages.
Banerjee, Atanu, "The 2007 Microsoft Office System and Other Platform Technologies for Building Composite Applications", http://msdn.microsoft.com/enus/library/bb220802.aspx, Dec. 2006, 14 Pages.
Bederson, et al., "Toolkit Design for Interactive Structured Graphics", In Proceedings of IEEE Transactions on Software Engineering, vol. 30, Issue 8., Aug. 30, 2004, pp. 535-546.
Bian, et al., "Ranking Specialization for Web Search: A Divide-and-Conquer Approach by Using Topical RankSVM", In Proceedings of the 19th International conference on World wide web, Apr. 26, 2010, 10 Pages.
Biddick, Michael, "Six Questions to Ask Before Buying End-to-End APM", http://www.networkcomputing.com/applications/six-questions-to-ask-before-buying-end-to-end-apm/a/d-id/1231626?, Jun. 21, 2010, pp. 1-9.
Blackwell, et al., "Tangible Interaction in a Mobile Context", CHI 2007 workshop on Tangible User Interface in Context and Theory,San Jose, CA,, Apr. 28, 2007.
Bouquet, et al., "An Entity Name System for Linking Semantic Web Data", In Workshop on Linked Data on the Web, April 22, 2008, 10 Pages.
Bourke, Paul, "POV-Ray: A Tool for Creating Engaging Visualisation of Geometry", Available at: https://web.archive.org/web/20120328233142/http://local.wasp.uwa.edu.au/~pbourke/geometry/representation/, Jan. 2004, 13 Pages.
Brook, Russel, "Solid Edge Design Sensors", Retrieved from: http://www.cadalyst.com/manufacturing/solid-edge-design-sensors-on-edge-solid-edge-tutorial-11196, Apr. 1, 2008, 04 Pages.
Brook, Russell, "Solid Edge's Goal Seek: The Next Best Thing to Hindsight (On the Edge Solid Edge Tutorial)", Retrieved from: http://www.cadalyst.com/manufacturing/solid-edge039s-goal-seek-the-next-best-thing-hindsight-on-edge-solid-edge-tutorial-111, Oct. 1, 2007, 05 Pages.
Brook, Russell, "Supply Chain Collaboration (On the Edge Solid Edge Tutorial)", Retrieved from: http://www.cadalyst.com/manufacturing/supply-chain-collaboration-on-edge-solid-edge-tutorial-10930, Jan. 1, 2007, 07 Pages.
Bunus, Peter, "A Simulation and Decision Framework for Selection of Numerical Solvers in Scientific Computing", In Proceedings of 39th Annual Simulation Symposium, Apr. 2, 2006, pp. 178-187.
Chakrabarti, et al., "Enhancing Search with Structure", In Bulletin of the IEEE Computer Society Technical Committee on Data Engineering, vol. 33, Issue 1., 2010, pp. 3-24.
Chen, et al., "Towards Design Patterns for Dynamic Analytical Data Visualization", In Proceeding of the International Society for Optical Engineering, vol. 5295, Jun. 4, 2004, pp. 75-87.
Chi, et al., "A Taxonomy of Visualization Techniques using the Data State Reference Model", In Proceedings of the IEEE Symposium on Information Visualization, 2000, pp. 69-75.
Chi, et al., "Principles for Information Visualization Spreadsheets", In Proceedings of the IEEE Computer Graphics and Applications, vol. 18, Issue 4, Jul. 1998, pp. 30-38.
Chong, et al., "Secure Web Applications via Automatic Partitioning", In Proceedings of Twenty-First ACM SIGOPS Symposium on Operating Systems Principles, Oct. 14-17, 2007, pp. 31-44.
Chuah, et al., "SDM: Selective Dynamic Manipulation of Visualizations", In Proceedings of the 8th Annual ACM symposium on User interface and software technology, Dec. 1, 1995, pp. 61-70.

(56) References Cited

OTHER PUBLICATIONS

Collins, Jason, "Using Innovation in Technology to Create New Business Models", http://www.theshiftonline.com/?p=666, Oct. 25, 2010, 3 Pages.

Dai, et al., "Learning to Rank for Freshness and Relevancell", In Proceedings of the 34th International ACM SIGIR Conference on Research and Development in Information, Jul. 24-28, 2011, pp. 95-104.

Delaney, Andrew, "Direct Data Feed Services", http://www.ateamgroup.com/?dl id=7460&dl cm=on&dl la=O&dl ls=0, Jun. 2010, 8 Pages.

Demartini, et al., "A Model for Ranking Entities and Its Application to Wikipedia", In Proceedings of the Latin American Web Conference, Oct. 28, 2008, pp. 29-38.

Drago, et al., "From Graphs to Euclidean Virtual Worlds: Visualization of 3D Electronic Institutions", In Proceedings of the Thirtieth Australasian Conference on Computer Science, vol. 62, Jan. 30, 2007, pp. 25-33.

Ebert, et al., "Procedural Shape Generation for Multi-dimensional Data Visualization", In Journal Computers and Graphics, vol. 24, No. 3, Jun. 1, 2000, pp. 375-384.

Elick, et al., "Visualizing Software Changes", In IEEE Transactions on Software Engineering, vol. 28, Issue 4, Apr. 2002, pp. 396-412.

"International Search Report and Written Opinion Issued in PCT Application No. PCT/US2012/069604", dated Apr. 8, 2013, 10 Pages.

"International Search Report and Written Opinion Issued in PCT Application No. PCT/US2012/061241", dated Mar. 29, 2013, 10 Pages.

Plaisted, David A., "Equational Reasoning and Term Rewriting Systems", In Handbook of Logic in Artificial Intelligence and Logic Programming, Jun. 24, 1993, pp. 273-364.

Polthier, Konrad, "Geometry Processing—Discrete Geometry for Virtual Worlds", Available at: http://www.polthier.info/articles/iciam07/polthierICIAM07_final_2007_05_07.pdf, May 7, 2007, 2 Pages.

Pujol, "Porqpine: A Peer-to-Peer Search Engine", Retrieved from: https://upcommons.upc.edu/bitstream/handle/2117/97388/Porqpine.pdf, 2003, 10 Pages.

Puppin, et al., "The Query Vector Document Model", In Proceedings of the 15th ACM International Conference on Information and Knowledge Management, Nov. 6-11, 2006, pp. 880-881.

Ravindran, Karthik, "Integrating LOB Systems with the Microsoft Office System", Retrieved from: https://web.archive.org/web/20130126194817/https://msdn.microsoft.com/en-us/library/bb896607.aspx, Nov. 2007, pp. 1-18.

Ricarte, et al., "A Reference Software Model for Intelligent Information Search", In Journal Enhancing the Power of the Internet, 2004, pp. 311-330.

Roberts, Jonathan C., "State of the Art : Coordinated & Multiple Views in Exploratory Visualization", In Proceedings of Fifth International Coordinated and Multiple Views in Exploratory Visualization, Jul. 2, 2007, pp. 61-71.

Robertson, Mark R., "Sproose-Social Video Search Engine & Voting", Retrieved from: http://web.archive.org/web/20080102115155/http://reelseo.com/sproose-social-video-search/, Nov. 20, 2007, 2 Pages.

Rodrigues, et al., "Reviewing Data Visualization: an Analytical Taxonomical Study", In Proceedings of Tenth International Conference on Information Visualisation, Jul. 5, 2006, pp. 713-720.

Roth, et al., "Toward an Information Visualization Workspace: Combining Multiple Means of Expression", In Journal human-Computer Interaction, vol. 12 No. 1 & 2, Mar. 1, 1997, pp. 131-185.

Roto, et al., "Browsing on Mobile Phones", Available at: http://www.ambuehler.ethz.ch/CDstore/www2008/www.research.att.com/~rjana/WF12_Paper1.pdf, May 10, 2005.

Saeyor, et al., "Visual Authoring Tool for Presentation Agent Based on Multimodal Presentation Markup Languages", In Proceedings of IEEE Fifth International Conference on Information Visualization, 2001, pp. 563-567.

Sawant, et al., "PerfViz: A Visualization Tool for Analyzing, Exploring, and Comparing Storage Controller Performance Data", In Journal Visualization and Data Analysis, vol. 6495, p. 649507, Jan. 29, 2007, 11 Pages.

Sen, et al., "Multi-Domain Physical System Modeling and Control Based on Meta-Modeling and Graph Rewriting", In Proceeding of the IEEE Conference on Computer Aided Control Systems Design, Oct. 4, 2006, pp. 69-75.

Shah, et al., "Phylo-VISTA: An Interactive Visualization Tool for Multiple DNA Sequence Alignments", Available at: https://cloudfront.escholarship.org/dist/prd/content/qt9kd5t5zh/qt9kd5t5zh.pdf, Apr. 25, 2003, 27 Pages.

Shahar, et al., "Intelligent Visualization and Exploration of Time-Oriented Clinical Data", In Proceedings of the 32nd Hawaii International Conference on System Sciences, Jan. 5, 1999, pp. 1-12.

Sharma, et al., "Virtual Reality and Haptics in Nano- and Bionanotechnology Turning Data into Decisions", In Handbook of Theoretical and Computational Nanotechnology, vol. 10, 2005, pp. 1-33.

Sheth, Amit, "From Semantic Search & Integration to Analytics", In Proceedings of Dagstuhl Seminar on Semantic Interoperability and Integration, Sep. 19, 2004, pp. 1-10.

Shiozawa, et al., "3D Interactive Visualization for Inter-Cell Dependencies of Spreadsheets", In Proceedings IEEE Symposium on Information Visualization, Oct. 24, 1999, pp. 79-82.

Simeoni, et al., "Metadata Harvesting for Content-Based Distributed Information Retrieval", In Journal of the American Society for Information Science and Technology, Jan. 1, 2008, pp. 12-24.

Spillner, "Flexible Human Service Interfaces", http://citeseerx.ist.psu.edu/viewdoc/download?doi=10.1.1.70.7734&rep=rep1&type=pdf, Jun. 2007, pp. 79-85.

Storey, et al., "SHriMP Views: An Interactive Environment for Information Visualization and Navigation", In Proceedings of CHI'02 Extended Abstracts on Human Factors in Computing Systems, Apr. 20, 2002, pp. 520-521.

Tanin, et al., "Browsing Large Online Data Tables using Generalized Query Previews", In Proceedings of Information Systems, vol. 32, Issue 3, May 1, 2007, pp. 402-423.

Tatsubori, et al., "HTML Templates that Fly: A Template Engine Approach to Automated Offloading from Server to Clien", In Proceedings of the 18th International Conference on World Wide Web, Apr. 20, 2009, pp. 951-960.

Tory, Melanie, "A Model-Based Visualization Taxonomy", In Thesis Submitted to School of Computing Science, Simon Fraser University, 2002, 04 Pages.

Tory, et al., "Rethinking Visualization: A High-Level Taxonomy", In Proceedings of IEEE Symposium on Information Visualization, Oct. 10, 2004, pp. 151-158.

Tsoukalas, et al., "PLEDS: A Personalized Entity Detection System Based on Web Log Mining Techniques", In Ninth International Conference on Web-Age Information Management, Jul. 20, 2008, pp. 389-396.

Valente, et al., "A Game Development Tool", Available at: http://guff.tigris.org/docs/Sibgrapi05-en.pdf, 2005, pp. 1-10.

Viegas, et al., "Many Eyes: A Site for Visualization at Internet Scale", In Proceedings of IEEE Transactions on Visualization and Computer Graphics, vol. 13, No. 5, Nov. 2007, 8 Pages.

Waitelonis, et al., "Semantically Enabled Exploratory Video Search", In Proceedings of the 3rd International Semantic search workshop., Apr. 26, 2010, 8 Pages.

Weaver, Chris, "Building Highly-Coordinated Visualizations in Improvise", In Proceedings of IEEE Symposium on Information Visualization, Oct. 10, 2004, pp. 159-166.

Webb, et al., "The In-Context Slider: A Fluid Interface Component for Visualization and Adjustment of Values while Authoring", In Proceedings of the Working Conference on Advanced Visual Interfaces, May 28, 2008, pp. 91-99.

Wen, et al., "Query Clustering in the Web Context", In Book Clustering and Information Retrivial, Chapter 7, Kluwer Academic Publisher, 2002, pp. 195-225.

White, Colin J., "IBM enterprise analytics for the intelligent e-business", Retrieevd from:ftp://129.35.224.112/software/data/informix/pubs/papers/bisolution/bisolution.PDF, Sep. 2001, 34 Pages.

(56) References Cited

OTHER PUBLICATIONS

Whiting, et al., "Web Theme: Understanding Web Information through Visual Analytics", In Proceedings of International Semantic Web Conference, Jun. 9, 2002, pp. 460-468.
Wu, et al., "Physics-based Mathematical Conditioning of the MOSFET Surface Potential Equation", In Proceedings of IEEE Transactions on Electron Devices, vol. 51, No. 7., Jul. 2004, pp. 1196-1199.
Xu, et al., "Constraint-based Automatic Placement for Scene Composition", In Graphics Interface, vol. 2, Issue 4, May 2002, 10 Pages.
Yang, et al., "A Unified Platform for Data Driven Web Applications with Automatic Client-Server Partitioning", In Proceedings of the 16th International Conference on World Wide Web, May 8, 2007, pp. 341-350.
Yang, et al., "Analysis Guided Visual Exploration of Multivariate Data", In Proceedings of the 2007 IEEE Symposium on Visual Analytics Science and Technology, Oct. 30, 2007, pp. 83-90.
Yeh, Andy, "VRMath: Knowledge Construction of 3D Geometry in Virtual Reality Microworlds", In Proceedings of CHI'04 Extended Abstracts on Human Factors in Computing Systems, Apr. 24-29, 2004, pp. 1061-1062.
Yi, et al., "Dust & Magnet: Multivariate Information Visualization Using a Magnet Metaphor", In Proceedings of Information visualization vol. 4, Issue 4, Dec. 4, 2005., pp. 239-256.
Yourdon, et al., "System Structure Analysis: Clustering with Data Bindings", In Journal of IEEE Transactions on Software Engineering—Annals of discrete mathematics, vol. 11 Issue 8, Aug. 8, 1985, pp. 749-757.
Yu-Feng, et al., "Improving Information Retrieval System by Co-clustering Web Documents and Queries", In Proceedings of Advances in Information Sciences and Service Sciences (AISS), vol. 3, Issue 8, Sep. 2011, 8 Pages.
Zhang, et al., "A Regression-Based Analytic Model for Dynamic Resource Provisioning of Multi-Tier Application", In Proceedings of Fourth International Conference on Autonomic Computing, 2007, Jun. 11, 2007, 11 Pages.
Zordan, et al., "Motion Capture-Driven Simulations that Hit and React", In Proceedings of the 2002 ACM SIGGRAPH/Eurographics Symposium on Computer Animation, Jul. 21, 2002, pp. 89-96.
"3D Landscape Design & Visualization Software", Retrieved from: http://3dnature.com/, 2008, 01 Page.
Marcus, et al., "3D Representations for Software Visualization", In the Proceedings of the ACM symposium on Software Visualization, Jun. 11, 2003, 10 Pages.
"About SAGA GIS", Retrieved from: www.saga-gis.uni-goettingen. de/html/index.php, Aug. 1, 2008, 03 Pages.
"Anthropomorphic Visualization: A New Approach for Depicting Participants in Online Spaces", Retrieved from: http://smg.media. mit.edu/papers/Perry/lb270-perry.PDF, Apr. 24, 2004, 04 Pages.
"Broader Perspective", Available at: http://futurememes.blogspot. com/2008/02/data-visualization-in-second-life.html, Feb. 10, 2008, 5 Pages.
"ChemSite 3D Molecular Visualization Software", Retrieved from: www.chemistrysoftware.com/modelling/10190.htm, Aug. 1, 2008, 05 Pages.
"Document Processing System", Rerieved from: http://www.wolfram. com/products/mathematica/analysis/content/ DocumentProcessingSystems.html, Nov. 16, 2007, 2 Pages.
"Enterprise Search from Microsoft", In Microsoft White Paper, Jan. 2007, 16 Pages.
"Filter Search Results", Retrieved from: https://support.google.com/ websearch/answer/142143?hl=en, Retrieved on: Feb. 24, 2010, 1 Page.
"GIS Modeling", Retrieved from: www.clarklabs.org/products/GIS-Modeling.cfm, 2006, 03 Pages.
"HFSS: User's Guide Version 10", In Ansoft Corporation, Jun. 21, 2005, 100 Pages.
"How can I change the size of the object in Autocad", Retrieved from: https://answers.yahoo.com/question/index?qid= 20080214221402AASmjoB, Feb. 14, 2008, 01 Page.
"How to Customize Ubuntu into your own custom distribution", Available at: https://www.linuxquestions.org/questions/ubuntu-63/ how-to-customize-ubuntu-into-your-own-custom-distribution-663412/, Aug. 17, 2008, 10 Pages.
"Implicit Equations in MML", Available at: https://www.physiome. org/jsim/docs/MML_Implicit.html, Mar. 3, 2008, 7 Pages.
"Introduction to the XML Pipeline Definition Language (XPL)", Retrieved from: https://web.archive.org/web/20100115060615/http:// www.orbeon.com/orbeon/doc/reference-xpl-pipelines, Retrieved Date: Sep. 10, 2010.
"LeoStatistic—building histogram, curve fit, multivariate regression, data modeling software", Retrieved from: https://web.archive. org/web/20160317025738/http://www.leokrut.com/leostatistic. html, Sep. 21, 2010, pp. 1-6.
"Maplesoft Enhances Math Software", Retrieved from: www. automation.com/content/maplesoftenhances-math-software, Aug. 26, 2008, 02 Pages.
"Math Package Gives you Extensive Range of Symbolic and Numerical Capabilities", Retrieved from: http://findarticles.com/p/ articles/mi_hb4804/is_198907/ai_n17443817, Aug. 26, 2008, 05 Pages.
"MATLAB", Retrieved from: www.bc.edu/offices/researchservices/ software/Matlab.html, Mar. 2007, 03 Pages.
Chakraborty, et al., "Multi-Dimensional Data Visualization", Retrieved from: http://citeseerx.ist.psu.edu/viewdoc/download?doi=10.1.1.2. 3248&rep=rep1&type=pdf, Sep. 13, 2007, 7 Pages.
"Optimizing Forms Processing", http://www.movetonow.com/ contentloptimizing_ forms _processing, Sep. 15, 2010, 2 Pages.
"Plug-in Architecture of Constraint Hierarchy Solvers1", In Proceedings of the 3rd International Conference on the Practical Application of Constraint Technology, 1997, pp. 359-371.
"Publishing applications to market place", https://www.zoho.com/ creator/help/marketplace/publish-to-marketplace.html, Nov. 26, 2010, pp. 1-5.
"Quella Business Intelligence Package", Retrieved from: https:// quella-business-intelligence-solution.soft112.com/, Dec. 21, 2007, 1 Page.
"SchematicSolver", Retrieved from: www.SchematicSolver.com, Retrieved Date: Aug. 26, 2008, 02 Pages.
"Search Engine Research Papers", Retrieved from: http://www. academia.edu/Documents/in/Search_Engine, Jul. 2, 2005, 14 Pages.
"Solid Edge User's Guide Version 8", In Book of Unigraphics Solutions, 2000, 316 Pages.
"Solver Platform SDK—Solver Engines", Retrieved from: http:// www.solver.com/sdkengines.htm, Retrieved Date: Apr. 11, 2008, 04 Pages.
"NMM Chapter 8: Solving Systems of Equations", Available at: http://web.mit.edu/10.10/www/Study_Guide/LinearEquations. html, Oct. 16, 2002, 8 Pages.
"Square your search results with Google Squared", Retrieved from: https://web.archive.org/web/20181204133121/http://googleblog. blogspot.com/2009/06/square-your-search-results-with-google. html, Jun. 3, 2009, pp. 1-4.
"TIBCO Spotfire DecisionSite Enterprise Analytics Product Suite", Retrieved from: https://web.archive.org/web/20080826062631/http:// spotfire.tibco.com/products/decisionsite.cfm, Aug. 26, 2008, 03 Pages.
Burkhand, et al., "Tube Map: Evaluation of a Visual Metaphor for Interfunctional Communication of Complex Projects", In the Proceedings of I-Know, Jun. 30, 2004, 08 Pages.
"Turning Data into Decisions", Available at: https://web.archive. org/web/20110628152753/http://www.corda.com/centerview-performance-dashboard.php, 2004, 2 Pages.
"User Customization", http://docstore.milk.ua/orelly/per/3/tk/ch16_ 01.html, Nov. 26, 2010, pp. 1-4.
"Visual Metaphors for Database Exploration1", In Proceedings of the Second FADIVA Meeting, 1995, 13 Pages.
"Visual Representations and Interaction Technologies", Retrieved from: https://web.archive.org/web/20111015004354/http://nvac.pnl. gov/docs/RD_Agenda_NVAC_chapter3.pdf, 2005, pp. 69-104.
"Web Creator Pro-3", Available at: http://www.download32.com/ web-creator-pro-i27472.html, Apr. 15, 2005, 2 Pages.
"What Is SpeedTreeMax?", Available at: http://www.speedtree.com/ products/speedtree_max.html, 2005, 2 Pages.

(56) References Cited

OTHER PUBLICATIONS

"Windows Azure and Cloud Computing", http://oakleafblog.blogspot.com/2010/09/windows-azure-and-cloud-computingposts09.html, Sep. 9, 2010, pp. 1-68.
"Office Action Issued in Indian Patent Application No. 08310/CHENP/2010", dated May 18, 2018, 08 Pages.
"Office Action Issued in European Patent Application No. 09771068.5", dated Oct. 13, 2017, 8 Pages.
"Oral Hearing Issued in European Patent Application No. 09771068.5", dated Jun. 8, 2018, 10 Pages.
"Search Report Issued in European Patent Application No. 09771068.5", dated Oct. 18, 2013, 7 Pages.
"Office Action Issued in European Patent Application No. 11772416.1", dated Oct. 30, 2013, 5 Pages.
"Supplementary Search Report Issued in European Patent Application No. 11772416.1", dated Oct. 17, 2013, 3 Pages.
"Final Office Action Issued in U.S. Appl. No. 12/163,863", dated Feb. 1, 2011, 14 Pages.
"Non Final Office Action Issued in U.S. Appl. No. 12/163,863", dated Nov. 10, 2010, 17 Pages.
"Non Final Office Action Issued in U.S. Appl. No. 12/163,863", dated Jul. 22, 2011, 19 Pages.
"Final Office Action Issued in U.S. Appl. No. 12/163,867", dated Sep. 28, 2011, 28 Pages.
"Final Office Action Issued in U.S. Appl. No. 12/767,188", dated Jun. 6, 2013, 27 Pages.
"Final Office Action Issued in U.S. Appl. No. 12/767,188", dated Jun. 7, 2012, 22 Pages.
"Non Final Office Action Issued in U.S. Appl. No. 12/767,188", dated Dec. 13, 2011, 21 Pages.
"Non Final Office Action Issued in U.S. Appl. No. 12/767,188", dated Nov. 5, 2012, 23 Pages.
"Final Office Action Issued in U.S. Appl. No. 12/767,211", dated Jun. 25, 2012, 15 Pages.
"Final Office Action Issued in U.S. Appl. No. 12/767,211", dated Jul. 17, 2014, 14 Pages.
"Final Office Action Issued in U.S. Appl. No. 12/767,211", dated Jul. 30, 2013, 15 Pages.
"Non Final Office Action Issued in U.S. Appl. No. 12/767,211", dated Dec. 20, 2013, 16 Pages.
"Non Final Office Action Issued in U.S. Appl. No. 12/767,211", dated Jan. 18, 2013, 18 Pages.
"Non Final Office Action Issued in U.S. Appl. No. 12/767,211", dated Nov. 23, 2011, 12 Pages.
"Final Office Action Issued in U.S. Appl. No. 12/767,247", dated Dec. 18, 2015, 18 Pages.
"Final Office Action Issued in U.S. Appl. No. 12/767,247", dated Sep. 25, 2012, 12 Pages.
"Final Office Action Issued in U.S. Appl. No. 12/767,247", dated Jan. 2, 2015, 16 Pages.
"Non Final Office Action Issued in U.S. Appl. No. 12/767,247", dated Jun. 19, 2014, 13 Pages.
"Non Final Office Action Issued in U.S. Appl. No. 12/767,247", dated Apr. 4, 2012, 10 Pages.
"Final Office Action Issued in U.S. Appl. No. 12/770,272", dated Jun. 13, 2012, 12 Pages.
"Final Office Action Issued in U.S. Appl. No. 12/770,272", dated Oct. 16, 2014, 14 Pages.
"Non Final Office Action Issued in U.S. Appl. No. 12/770,272", dated May 6, 2014, 11 Pages.
"Non Final Office Action Issued in U.S. Appl. No. 12/770,272", dated Feb. 14, 2012, 12 Pages.
"Final Office Action Issued in U.S. Appl. No. 12/770,294", dated May 24, 2012, 9 Pages.
"Final Office Action Issued in U.S. Appl. No. 12/770,294", dated Dec. 19, 2013, 8 Pages.
"Non Final Office Action Issued in U.S. Appl. No. 12/770,294", dated Oct. 26, 2012, 10 Pages.
"Non Final Office Action Issued in U.S. Appl. No. 12/770,294", dated Jun. 10, 2013, 9 Pages.
"Non Final Office Action Issued in U.S. Appl. No. 12/770,294", dated Nov. 28, 2011, 9 Pages.
"Final Office Action Issued in U.S. Appl. No. 12/777,564", dated Nov. 8, 2016, 15 Pages.
"Final Office Action Issued in U.S. Appl. No. 12/777,564", dated May 20, 2015, 13 Pages.
"Final Office Action Issued in U.S. Appl. No. 12/777,564", dated Nov. 13, 2012, 11 Pages.
"Non Final Office Action Issued in U.S. Appl. No. 12/777,564", dated May 22, 2012, 16 Pages.
"Non Final Office Action Issued in U.S. Appl. No. 12/777,564", dated May 17, 2016, 16 Pages.
"Non Final Office Action Issued in U.S. Appl. No. 12/777,564", dated Dec. 3, 2014, 12 Pages.
"Non Final Office Action Issued in U.S. Appl. No. 12/777,564", dated Jun. 29, 2017, 16 Pages.
"Final Office Action Issued in U.S. Appl. No. 12/819,493", dated Nov. 5, 2013, 21 Pages.
"Final Office Action Issued in U.S. Appl. No. 12/819,493", dated Aug. 15, 2012, 17 Pages.
"Non Final Office Action Issued in U.S. Appl. No. 12/819,493", dated Apr. 10, 2013, 17 Pages.
"Non Final Office Action Issued in U.S. Appl. No. 12/819,493", dated Mar. 30, 2012, 16 Pages.
"Non-Final Office Action Received for U.S. Appl. No. 12/819,493", dated Mar. 21, 2014, 21 Pages.
"Final Office Action received for U.S. Appl. No. 12/971,462", dated Sep. 18, 2013, 25 pages.
"Non-Final Office Action received for U.S. Appl. No. 12/971,462", dated Mar. 21, 2013, 22 pages.
"Final Office Action received for U.S. Appl. No. 12/971,638", dated Feb. 25, 2014, 12 Pages.
"Non Final Office Action received for U.S. Appl. No. 12/971,638", dated Aug. 30, 2012, 19 Pages.
"Non Final Office Action received for U.S. Appl. No. 12/971,638", dated Nov. 18, 2014, 12 Pages.
"Final Office Action received for U.S. Appl. No. 12/971,685", dated Oct. 11, 2012, 16 pages.
"Non Final Office Action received for U.S. Appl. No. 12/971,685", dated Nov. 20, 2014, 18 Pages.
"Non-Final Office Action received for U.S. Appl. No. 12/971,685", dated Jul. 13, 2012, 11 Pages.
"Non-Final Office Action received for U.S. Appl. No. 12/971,685", dated Apr. 24, 2014, 16 Pages.
"Final Office Action received for U.S. Appl. No. 12/971,725", dated May 1, 2013, 14 pages.
"Final Office Action Received for U.S. Appl. No. 12/971,725", dated Jan. 15, 2015, 20 Pages.
"Non-Final Office Action received for U.S. Appl. No. 12/971,725", dated Jun. 23, 2014, 19 Pages.
"Non-Final Office Action received for U.S. Appl. No. 12/971,725", dated Aug. 21, 2012, 11 Pages.
"Final Office Action received for U.S. Appl. No. 12/971,782", dated Jan. 31, 2013, 11 Pages.
Evans, Will, "Dynamic Visualization: Introduction & Theory", http://web.archive.org/web/20090609074938/http://blog.semanticfoundry.com/2009/06/01/dynamic-visualization-introduction-theory, Jun. 1, 2009, 14 Pages.
Fox, et al., "WebFlow based Visual Authoring Tools for HLA Applications", In Proceedings of ITEA, Jul. 13, 1998, 8 Pages.
Frisch, A., "Streaming XML transformations using term rewriting", Available at: https://www.semanticscholar.org/paper/Lux%3A-A-Lightweight%2C-Statically-Typed-XML-Update-Cheney/0184e9cc22667800acded42dcb229dcaa31a0049, 2007, 13 Pages.
Fritzon, et al., "Modelica-A Unified Object-Oriented Language for System Modeling and Simulation", In European Conference on Object-Oriented Programming, Jul. 20, 1998, pp. 67-90.
Gardarin, et al., "XML-based Components for Federating Multiple Heterogeneous Data Sources", In Proceedings of International Conference on Conceptual Modeling, Nov. 15, 1999, pp. 506-519.

(56) References Cited

OTHER PUBLICATIONS

Giurgiu, et al., "Calling the Cloud: Enabling Mobile Phones as Interfaces to Cloud Applications", In Proceedings of the 10th ACM/IFIP/USENIX International Conference on Middleware, Nov. 30-Dec. 4, 2009, 20 Pages.

Grossenbacher, A., "Making Data Be Understood—and Easily Produced", In Proceedings of UNECE Workshop on Communication and Dissemination of Census Results, May 16, 2008, 21 Pages.

Gupta, et al., "ExSched: Solving Constraint Satisfaction Problems with the Spreadsheet Paradigm", In Proceedings of 16th Workshop on Logic-based Methods in Programming Environments, Jan. 17, 2007, 11 Pages.

Hanna, Michael, "2007 Flying Stars Analysis", Retrieved from: https://www.fengshuiweb.co.uk/advice/flyingstars2007.htm, 2007, 21 Pages.

Hart, John, "The Object Instancing Paradigm for Linear Fractal Modeling", In Journal Graphics Interface, vol. 92., Sep. 1, 1992, pp. 224-231.

Hartmann, et al., "DUST 1.5: Interactive Data Visualization", Retrieved from: https://www2.mps.mpg.de/dokumente/projekte/mas/dust-2/s4tool.pdf, Apr. 2000, 1 Page.

Heer, et al., "Design Consideration for Collaborative Visual Analytics", In Proceedings of IEEE Symposium on Visual Analytics Science and Technology, Oct. 30, 2007, 22 Pages.

Heer, et al., "Software Design Patterns for Information Visualization", In Proceedings of IEEE Transactions on Visualization and Computer Graphics, vol. 12, Issue 5, Sep. 1, 2006, pp. 853-860.

Herlocker, et al., "Content-Independent Task-Focused Recommendation", In Proceedings of IEEE Internet Computing, vol. 5, Issue 6, Nov. 2001, pp. 40-47.

Hibino, et al., "Processing Incremental Multidimensional Range Queries in a Direct Manipulation Visual Query Environment", In Proceedings of the IEEE 14th International Conference on Data Engineering, Feb. 23, 1998, pp. 458-465.

Huh, et al., "A Framework of Online Community based Expertise Information Retrieval on Grid", In Kyung Hee University Memo, Jan. 14, 2010, 21 Pages.

Janeiro, et al., "Improving the Development of Service-Based Applications Through Service Annotations", In Proceedings of IADIS WWW/Internet, 2009, 2009, 8 Pages.

Jelinek, et al., "XML Visualization Using Tree Rewriting", In Proceedings of the 20th Spring Conference on Computer Graphics, Apr. 22, 2004, pp. 65-72.

Jermann, et al., "A Constraint Programming Approach for Solving Rigid Geometric Systems", In International Conference on Principles and Practice of Constraint Programming, Sep. 18, 2000, pp. 233-248.

Johnson, et al., "Building ETL Processes for Business Intelligence Solutions", Retrieved from: http://web.archive.org/web/20081205201733/http://www.ca.com/Files/WhitePapers/ca-erwin-building-etl-processes-sql-wp-us-en.pdf, Jul. 10, 2008, 6 Pages.

Kaasinen, Eija, "User Needs for Location-Aware Mobile Services", In Journal Personal and Ubiquitous Computing, vol. 7, Issue 1, Aug. 1, 2002, pp. 70-90.

Kakanakov, et al., "Adaptation of Web Service Architecture in Distributed Embedded Systems", In Proceedings on the International Conference on Computer Systems and Technologies—CompSysTech '05, Jun. 1, 2005, pp. 10-11.

Kirchner, et al., "Constrained Equational Reasoning", In Proceedings of the ACM-SIGSAM 1989 International Symposium on Symbolic and Algebraic Computation, Jul. 17, 1989, pp. 382-389.

Kniss, et al., "Interactive Volume Rendering using Multi-Dimensional Transfer Functions and Direct Manipulation Widgets", In the Proceedings of the Conference on Visualization 2001, Oct. 21, 2001, pp. 255-262.

Koehler, et al.,"The Role of Visual Modeling and Model Transformations in Business-driven Development", In Journal of Electronic Notes in Theoretical Computer Science, vol. 211, Apr. 28, 2008, pp. 5-15.

Kohlhase, et al., "A Search Engine for Mathematical Formulae", In Proceedings of the 8th International Conference on Artificial Intelligence and Symbolic Computation, Sep. 20-22, 2006, pp. 241-253.

Kohlhase, et al., "MathWebSearch 0.4 A Semantic Search Engine for Mathematics", Available at: https://www.researchgate.net/profile/Constantin_Jucovschi/publication/216797208_MathWebSearch_04_A_Semantic_Search_Engine_for_Mathematics/links/09e4150d8295248561000000.pdf, Jan. 2008, 13 Pages.

Krasner, et al., "A Cookbook for Using the Model-view Controller User Interface Paradigm in Smalltalk-80", Retrieved from: https://www.lri.fri/~mbl/ENS/FONDIHM/2013/papers/Krasner-JOOP88.pdf, Aug. 1988, pp. 26-49.

Lee, et al., "Precomputing Avatar Behavior from Human Motion Data", In Proceedings of Eurographics/ACM SIGGRAPH Symposium on Computer Animation, Mar. 1, 2006, pp. 158-174.

Lee, et al., "Re-Ranking Model Based on Document Clusters", In Information processing & management, vol. 37, Jan. 1, 2001, pp. 1-14.

Letcher, et al., "Relational Geometric Synthesis: Part 1—Framework", In Journal Computer-Aided Design, vol. 27, No. 11, Nov. 21, 1994, pp. 821-832.

Lewis, et al., "Task-Centered user Interface Design—A Practical Indroduction", Retrieved at http://hcibib.org/tcuid/tcuid.pdf, 1993, 190 Pages.

Li, et al., "EntityEngine: Answering Entity-Relationship Queries using Shallow Semantics", In Proceedings of the 19th ACM Conference on Information and Knowledge Management, Oct. 26, 2010, pp. 1925-1926.

Loukipoudis, Evgueni N., "Extending a Constructive Solver with Constraints Inferred by Variable Topology Parameterisation", 1997, pp. 311-320.

Lu, et al., "Interactive Storyboard for Overall Time-Varying Data Visualization", In Proceedings of IEEE Pacific Visualisation Symposium, Mar. 5, 2008, pp. 143-150.

Lv, et al., "Perret: A Toolkit for Content-Based Similarity Search ofFeature-Rich Data", In Proceedings of ACM SIGOPS Operating Systems Review, vol. 40, Issue 4, Oct. 1, 2006, pp. 317-330.

McFarlan, Jessica E., "Building Information Modeling for MEP", In the Thesis for Masters of Science, Kansas State University, 2007, pp. 1-52.

McNee, "Creating Auction Ads for Marketplaces", http://web.archive.org/web/20071107061852/http://www.e-articles.info/e/a/title/Creating-Auction-Ads-for-Marketplaces/, Apr. 19, 2007, 2 Pages.

Meng, et al., "Data Search Engine", In Wiley Encyclopedia of Computer Science and Engineering, 2008, 8 Pages.

Milton, et al., "On the Study of Data Modelling Languages using Chisholm's Ontology", In Proceedings of the Information Modelling and Knowledge Bases XIII, 2002, 18 pages.

Misutka, J., "Indexing Mathematical Content Using Full Text Search Engine", In the Proceedings of Contributed Papers, WDS'08, Part 1, 2008, pp. 240-244.

Mitchell, Neil, "Equational Reasoning in Haskell", Available at: http://neilmitchell.blogspot.com/2007/07/equational-reasoning-in-haskell.html, Jul. 9, 2007, 3 Pages.

Moere, Andrew Vande, "Time-Varying Data Visualization Using Information Flocking Boids", In Proceedings of IEEE Symposium on Information Visualization, Oct. 10, 2004, pp. 97-104.

Mostarda, "MU: an hybrid language for Web Mashups", In Proceedings of International World Wide Web Conference, Madrid, Spain, Apr. 2009, 10 pages.

Munavalli, et al., "MathFind: A Math-Aware Search Engine", In Proceedings of the 29th Annual International ACM SIGIR Conference on Research and Development in Information Retrieval, Aug. 6, 2006, pp. 735-735.

Nagel, Nick, "Enterprise Data Modeling Using XML Schema", http://citeseerx.ist.psu.edu/viewdoc/download?doi=10.1.1.135.6120&rep=rep1&type=pdf, 2007, 30 Pages.

Page, S., "XSL Pipeline Processing", http://www.usingxml.com/Transforms/XslPipelines, Jul. 2, 2007.

Pattath, et al., "Interactive Visualization and Analysis of Network and Sensor Data on Mobile Devices", In Proceedings of IEEE Symposium on Visual Analytics Science and Technology, Oct. 31, 2006, pp. 83-90.

(56) References Cited

OTHER PUBLICATIONS

"International Search Report and Written Opinion Issued in PCT Application No. PCT/US2009/48715", dated Feb. 12, 2010, 11 Pages.
"International Search Report and Written Opinion Issued in PCT Application No. PCT/US2011/031141", dated Sep. 28, 2011, 8 Pages.
"Office Action Issued in Chinese Patent Application No. 201611006817.5", dated Jan. 2, 2020, 9 Pages.

\* cited by examiner

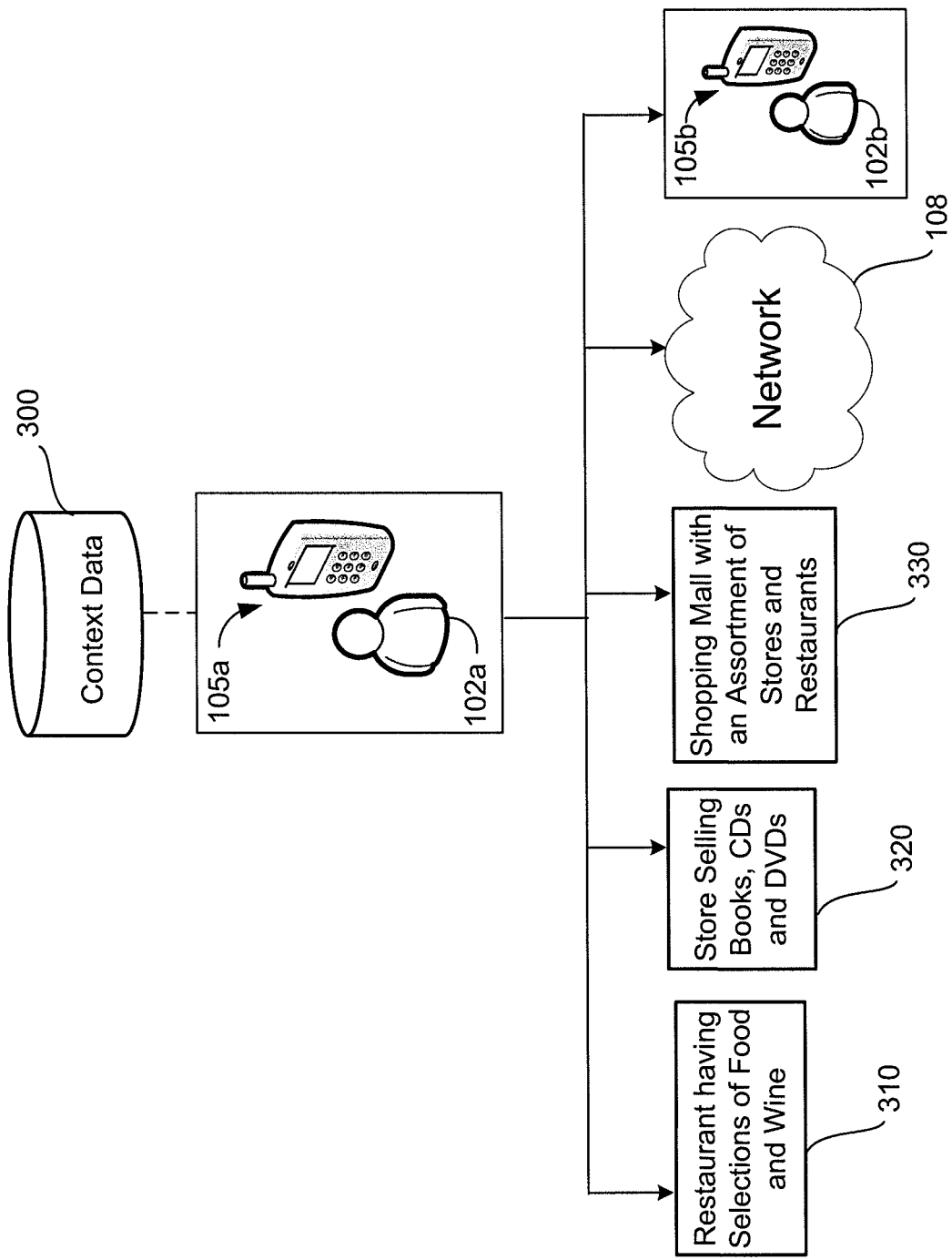

SYSTEM OF PROVIDING SUGGESTIONS BASED ON ACCESSIBLE AND CONTEXTUAL INFORMATION

BACKGROUND

The widespread availability of computer networks has enabled people to access vast quantities of information. Computer networks, such as the Internet, can potentially connect a computer user to any of numerous sources of information. In this way, people can obtain information about any number of things, including products, services or events. Such information may be accessed for personal reasons or business reasons, making ready availability to such information useful through fixed computers or portable electronic devices.

A conventional approach to access information over a computer network is to use a search engine. The search engine develops an index of items conveying information that is available over a computer network in advance of a user's submitting a request for information. The items are formatted so that they convey information when requested by a computer user. The items, for example, may be files containing information or web pages that can be accessed over the computer network. When the search engine receives a query, representing a user's request for information about a topic, the search engine selects one or more items by matching items in the index to the search query and provides the items to the user.

A conventional approach to formulating a search query is to receive a text string input by a user. The text string may contain terms and operators defining relationships between the terms that characterize the items that are likely to be of interest to the user. For example, a search for information about camera accessories may include such terms as "camera," "tripod," "flash." Such a query may also contain terms that can more precisely focus the query on items of interest to the user, such as brand names or model numbers. These additional terms may be included in the initial search query or may be added in a series of iterations, as the user reviews results of a query and then modifies the query based on returned results.

To improve the likelihood that items returned in response to a search query provide information of interest to a user, filtering may be employed in connection with searching. Using filtering, the query or set of results returned by a query may be automatically modified by the search engine. Filtering may be based on information previously obtained about a user submitting the search that reveals categories of interest to the user. The search engine may apply the information to weight search results towards items that contain information about categories determined to be of interest to the user.

SUMMARY

A user experience in obtaining data is improved relative to conventional systems of data inquiry. Based, at least in part, on a list of information and current contextual information, a suggestion is presented to a user. The suggestions may provide information about an item or may represent a potential selection that the user may be inclined to make to buy or otherwise access an item. In some embodiments, a computing device has access to lists of items and contextual data related to a context of the user. Based on the lists of information and the contextual data, a hypothesis may be generated as to an item that may be of interest to the user.

The hypothesis, for example, may be that the user is interested in information about an item that will fulfill a task based on one or more of the lists, such as matching, extending and/or completing one or more of the lists. Such an hypothesis may be applied, such as by searching a database, the Internet or other data store, to identify an item in accordance with the hypothesis, and information about that item may be presented as suggestion on the computing device.

A mobile computing device may implement such a system for presenting a suggestion to a user. The mobile computing device may have access to appropriate lists of information, which may include information associated with preferences, assets and/or wishes of the user. The lists may relate, for example, to express preferences of the user of the computing device, such as when the user makes a list of favorite books, songs or other items. Alternatively, a list may implicitly reveal preferences of the user, such as, for example, when a list is generated from a collection of items in the vicinity of the user or that the user has recently viewed or accessed. Moreover, it is not a requirement that the lists directly be preferences of the user. A list, for example, could be created by users of other computing devices that are associated with the user of the computing device. Accordingly, the lists may be stored on the mobile computing device or any computing device to which the mobile device has access.

A mobile computing device configured to make suggestions may be equipped with a variety of sensors that may sense data about an environmental context of the user. Such a sensor may indicate, for example, a location of the computing device or may sense items in the physical environment that represent options that are currently available for the user to choose.

Based on the lists of information and the context data, the mobile computing device formulates a hypothesis, which can then be used to identify one or more items of interest to the user, and presents such items as one or more suggestions. In some embodiments, using the hypothesis may involve the computing device performing a search according to sets of criteria defined from the relevant list(s) of information and the context data. For example, a hypothesis having a premise to extend a particular list of items may involve a search for items that fall within a category that would add to the list of interest. One or more appropriate items, which may be limited to items available in the current context, that turn up in the search are then presented as suggestions for the user to extend the list of items.

Once an initial suggestion is made, the computing device may receive user input that causes the device to present different or additional information. Such input may result in an alternative hypothesis being generated. Or, one or more searches may be conducted within an existing hypothesis to identify further items consistent with the hypothesis.

In some embodiments, when user input results in the computing device generating an alternative hypothesis, the alternative hypothesis may be generated for a list of information that is different from the list used to identify the suggested item. Alternatively or additionally, the alternative hypothesis may assume that the user is interested in a different action with respect to a list. For example, rather than identifying an item assuming that a user is interested in extending a list, the alterative hypothesis may be formed by assuming that the user wants to complete an ensemble of items included in a list. Thus, the computing device may generate different hypotheses based on user input.

In another embodiment, user input results in one or more searches to be conducted within the existing hypothesis.

That is, after a suggestion is presented, the user may provide feedback to the computing device of additional criteria from which a collection of possible suggestions may further be refined. As such, while the hypothesis remains the same, items that fall within the scope of the hypothesis are filtered to provide a more suitable suggestion for the user.

In some embodiments, the user does not input an explicit query for the computing device to present a suggestion. Yet, based on sensed context data and lists of information that are accessible to the computing device, the computing device automatically generates a hypothesis and presents a suggestion to the user that was not explicitly requested for by the user.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 4 is a schematic example of environments in which context data can be sensed by a computing device;

DETAILED DESCRIPTION

Figure 1:
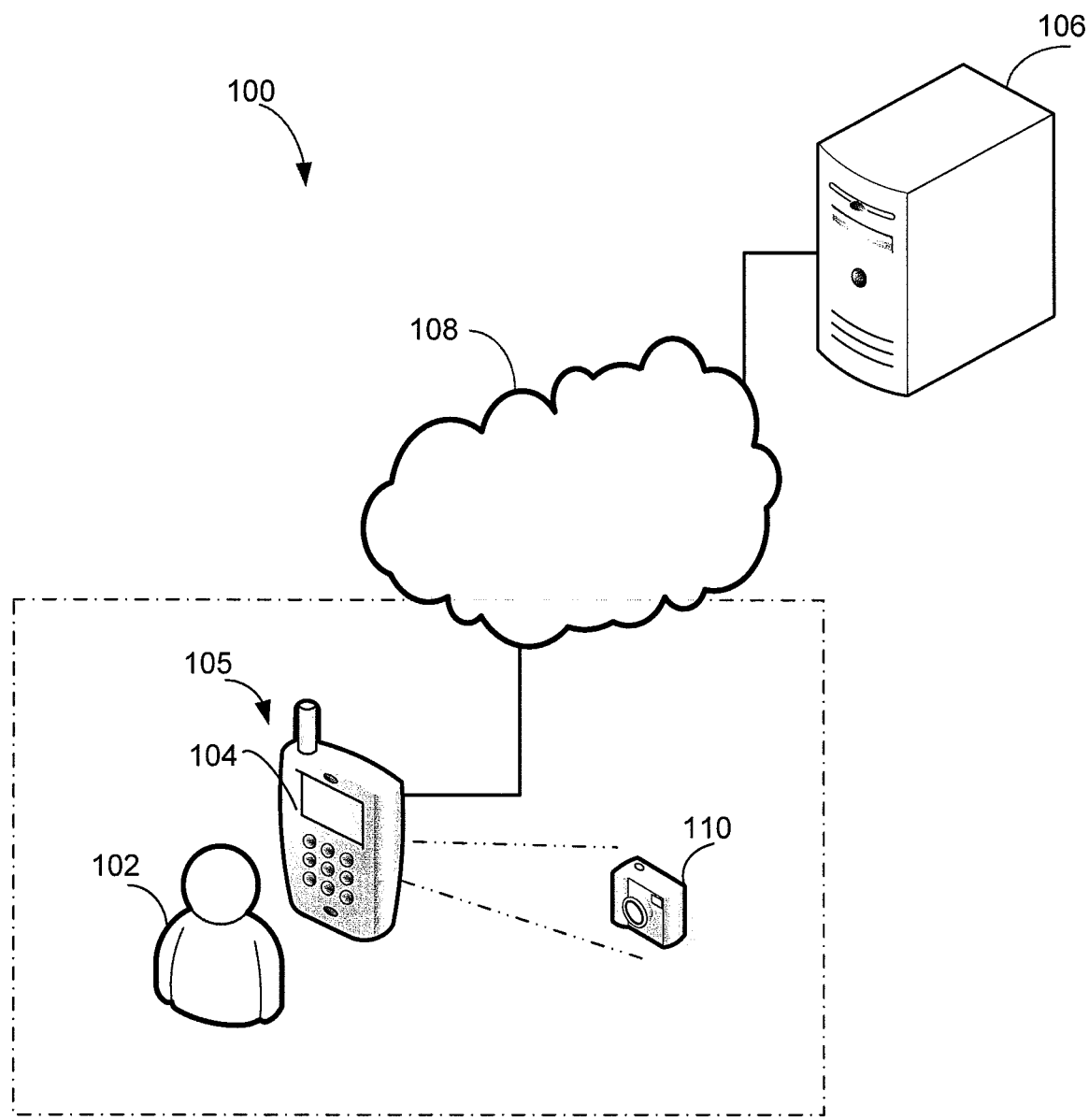
FIG. 1 is a high-level block diagram illustrating a computing environment in which some embodiments may be practiced.

The inventors have recognized and appreciated that current systems and methods of data inquiry are not equipped to offer suggestions, that may be of interest to a user. While passing through multiple environments having different contexts at any given moment in time, people are exposed to various types and degrees of information. Much of this information may be extraneous to identifying a current item of interest to the user. However, individuals may have interest in receiving a suggestion, which could relate to a selection among options that are available in a certain contextual environments, and might involve, for example, a suggestion for a particular product, service or event inferred to be of interest to the user. The inventors have recognized and appreciated that a suggestion may be generated, possibly without express user input, based on lists accessible to a computing devise and contextual data.

A computing device has access to lists of information related to a user and contextual data related to particular contexts of the user. Based on the lists of information and contextual data that may include options that are available for a user to choose from, the computing device formulates a hypothesis that can be used to search for information that can be presented to the user as a suggestion. In some cases, the hypothesis may be premised on the interest of a user in information about an item that will fulfill a task related to a list, such as matching, extending and/or completing one or more of the lists of information. Translation of the hypothesis to presentation of a suggestion may be carried out in any suitable way, such as by searching a database, the Internet or other data store to identify an item that suits the hypothesis.

Lists of information may be stored on the computing device or accessible on another computing device, for example through a network. The lists of information may relate to particular assets or preferences of the user, for example, a list of books owned, favorite food/wine combinations, favorite restaurants, restaurants the user would like to try or other collection of items related in some way. Lists may also provide implicit preferences of the user, such as a list that is generated from items that are close to the user, items that the user has recently purchased or accessed, or lists of other users of computing devices that may have an association with the user. These other users may be associated with the user through explicit action of the user, such as by making or responding to a "friend request" in a social network. Though, the associated users may be indentified in other ways such as users in close proximity to the user, users who have visited locations where the user is located, or users who shared a common activity or characteristic with the user, such as attending the same meeting, or expressing an interest in the same sport.

In some embodiments, a user is equipped with a mobile computing device (e.g., cell phone, PDA, portable computer, etc.) that has access to relevant lists of information. As the user may be exposed to one contextual environment after another, the mobile computing device senses information related to options that are currently available to the user. In this regard, contextual information may be stored transiently in a mobile computing device. However, it can be appreciated that context data may include information collected from past contexts of the user and may be stored on the mobile computing device or on any other computing device that may be accessed when a suggestion is to be generated for the user.

Moreover, it should be appreciated that context data may relate to things other than items that may be selected by a user. Context data, for example, can indicate a activity being performed or that may be performed by a user. Such data may be derived by sensing a physical environment or by sensing a computing environment of the user. As a specific example, context data may be sensed by accessing an electronic calendar of the user to identify a planned activity or may be sensed by accessing a log of locations visited by a user to predict a location to be visited. Accordingly, the mobile computing device may include any appropriate sensing devices, such as for example, GPS, compasses, range finders, pointers, microphones, cameras or any other suitable sensors. Sensors may collect information about any implicit or explicit actions taken by the user through the environment. For example, the user pointing the mobile device at a particular building may serve to gather context data.

Based on one or more lists and context data, the device may generate one or more appropriate hypotheses that result in a suggestion for the user. In some embodiments, the mobile computing device may have an application running thereon that instructs the device to generate a hypothesis, which results in the device accessing lists of items and contextual data that are specific to the particular application running on the computing device. As the computing device gathers context data, such as from the user accessing wireless networks in different locations, the user pointing at or highlighting different objects in his/her environment, or the user accessing various data from the device, the mobile computing device assists the user by suggesting information for the user. This information may relate to some item in the user's context though, other types of suggestions may be made. The device may assist the user by fulfilling a task implied by or made possible by the context. For example, if the user owns five of six books in a volume set and the device senses that the sixth book is available in the user's current context for purchase, the device may offer to the user a suggestion to purchase the currently available sixth book.

In another example, an application running on a mobile computing device provides a user interface for presenting suggestions to the user of a movie to rent in a DVD rental store. The application may instruct the device to sense data regarding movies that are available for the user to rent in the store that the user is currently located in. Such information can be sensed, for example, by a bar code reader on the mobile device, or by accessing an online catalogue for the rental store, or in any other suitable way. Based on lists such as, for example, what movies the user has already seen, what movies certain friends of the user have already seen, and/or what actors the user has a preference to watch, the mobile computing device may generate a hypothesis of what DVDs the user may prefer to rent. In particular, the hypothesis may draw from relevant lists of information with a goal to extend those lists of information by finding items similar to items in those lists. For example, if a list of recently viewed movies include no movies with the same starring actors, a requirement in a hypothesis may include movies that feature a particular actor which neither the user nor certain friends of the user has seen. Regardless of the hypothesis, the mobile computing device may perform a search for movies that satisfy the hypothesis, resulting in movies currently available for rental which are, in turn, offered to the users as suggestions of potential selections.

In another example, a mobile computing device may have access to one or more lists of information regarding books that the user has an interest in. One list may include books that the user already owns. Another list may include books that the user does not own, but is interested in either purchasing or reading. Another list may include books that a person other than the user may own or have an interest in. Whether a book is included on a list or not may influence whether the book is presented as a suggestion to the user. For instance, if a book is included in a list of books that the user already owns and context data indicates that the user is in a book store where the user has previously purchased books, then it may be less likely that the mobile computing device will form an hypothesis that the user wants information on an already-owned book. Rather, the mobile computing device may form an hypothesis that the user is interested in a book like a book included in a list of books that the user owns or is included in a list of books that an associated user has read and likes. Though, it may be that context data indicates that the user is involved in an activity that requires knowledge of previously read books. In this scenario, the hypothesis may lead to a suggestion of an item on a list of previously read books.

In making suggestions, information other than lists and context data may be used. For example, priority information may be used. Items on certain lists may be prioritized according to any suitable standard. For example, certain books that populate a list may be more highly desired by the user than others and, accordingly, may be labeled as higher in priority as compared to other books that are not as desirable to the user. In some embodiments, preferences that a user may have are tied to preferences of others such as friends or critics. For example, certain books may be labeled as higher in priority for the user because of a recommendation from a friend or critic, in contrast to other books that might not be subject to such a recommendation.

As the user of a mobile computing device having access to lists of book information (e.g., stored thereon or accessible through a network) enters into a book store, the device may detect books that are available in the book store for the user to peruse and potentially purchase. Based on the list(s) of book information accessed by the mobile computing device and the current availability of books in the book store, the device may formulate a hypothesis as to one or more books that the user may have interest in and subsequently create one or more suggestions to present to the user based on the hypothesis. The user may then choose to follow or disregard the suggestion.

Regardless of how the suggestion is generated, after the suggestion is presented to the user, the user may be presented with options to provide feedback to the mobile computing device, providing further information to the device. In some cases, the feedback may cause the device to generate an alternative hypothesis. In other cases, the hypothesis remains the same, but, one or more searches may be conducted to further refine or find additional suggestions in a manner that is consistent with the hypothesis. It can be appreciated that any suitable input can be provided to the mobile computing device to update one or more displayed suggestions.

To facilitate such user feedback, the mobile device may present, along with a suggestion, information about the hypothesis that led to the suggestion. For example, a user in a book store may be presented with a suggestion to complete a book set. The device may present, along with the suggestion, the hypothesis that led to the suggestion. If the user is not interested in purchasing a book, but instead, would rather be offered a suggestion to purchase a song album, an appropriate input can be entered into the computing device. Accordingly, an alternative hypothesis may be generated that is based on a list of music albums rather than a list of books. Additionally, rather than seeking to complete a volume set of albums, the user may have a desire to extend a book collection. Thus, the alternative hypothesis may be formed that a user wants information on books similar to those on a list of books recently read by the user. A suggestion may be presented to the user of books identified based on this hypothesis.

It can be appreciated that future hypotheses and suggestions may be predicated, at least in part, on feedback input to a computing device. In some embodiments, a user provides explicit feedback to the mobile computing device (e.g., via a graphical interface) that a suggested item should not have been proposed. Accordingly, based on the negative feedback, the mobile computing device may make a record that the item that should not have been proposed. In hypotheses generated moving forward, such an item may be given significantly lower priority than previously. Or, implicit feedback may be provided to the mobile computing device in the form of an absence of an explicit input to the device. In such a case, when a suggested item has been ignored multiple times, the mobile computing device may make a record that the item maintain or be only slightly downgraded in level of priority than previously assigned.

Turning to the figures, FIG. 1 is a high level diagram illustrating a computing environment 100 in which some embodiments of the invention may be practiced. Computing environment 100 includes a user 102 interacting with a computing device 105. Computing device 105 may be any suitable computing device, such as a desktop computer, a laptop computer, a mobile phone or a PDA. Though, in the embodiment illustrated, computing device 105 is a mobile device. Computing device 105 may operate under any suitable computing architecture, and include any suitable operating system, such as variants of the WINDOWS® Operating System developed by MICROSOFT® Corporation.

Computing device 105 may have the capability to communicate over any suitable wired or wireless communications medium to a server 106. The communication between computing device 105 and server 106 may be over computer network(s) 108, which may be any suitable number or type of telecommunications networks, such as the Internet, an intranet (e.g., corporate, home, or store intranet), or cellular networks. Server 106 may be implemented using any suitable computing architecture, and may be configured with any suitable operating system, such as variants of the WINDOWS® Operating System developed by MICROSOFT® Corporation. Moreover, while server 106 is illustrated in FIG. 1 as being a single computer, it may be any suitable number of computers configured to operate as a coherent system.

Computing device 105 may also have the capability of sensing data regarding an environment of a user 102 through any suitable method, such as a wireless communication (e.g., radio frequency, satellite, infrared, laser light). In this respect, computing device 105 may be equipped with one or more suitable sensors for acquiring information, such as through wireless data transmissions or image acquisition.

Server 106 may operate as a database server that implements a search service, allowing user 102 to access information from a data store. The data store may include, for example, information posted on the Internet or may include a more limited data set, such as information available over an intranet. Server 106 also may contain or have access to information related to a context of the user 102 that is made accessible through computing device 105. In an embodiment, the data store on server 106 is a database having information regarding a number of potential selections that a user has the option to make, such as information regarding books for sale. In other embodiments, server 106 contains or has access to data regarding one or more lists of information or data that supplements one or more lists of information, readily accessible by computing device 105. It should be appreciated that embodiments described herein may operate in connection with any suitable data store or sources of data.

To access information from the data store, the user may specify a query explicitly, such as by inputting query terms into computing device 105 in any suitable way, such as via a keyboard, key pad, mouse and/or voice input. Additionally and/or alternatively, the user may provide an implicit query. For example, computing device 105 may be equipped with (or connected via a wired or wireless connection to) a digital camera 110. An image, such as of an object, a scene, or a barcode scan, taken from digital camera 110 may serve as an implicit query. Alternatively or additionally, a query may be generated implicitly by user input accessing a type of database. For example, accessing a database containing books for sale, may serve as an implicit query for information on books for sale.

Alternatively or additionally, computing device 105 may automatically or semi-automatically access information from the data store and present this information to the user as a suggestion. Computing device 105 may access information based on context data. In some embodiments, information used in making a suggestion is downloaded from the data store to the computing device 105 without an explicit input to the computing device 105 from the user. Though, in other embodiments, express or implicit user input indicating a possible user interest in information may be identified by computing device 105 and trigger a process of generating a suggestion. A computing device 105 may include a user interface having any suitable interactive mechanism for a user to provide input to the computing device 105 and for information to be presented to a user. Such an interactive mechanism may or may not be graphical in nature.

Figure 2:
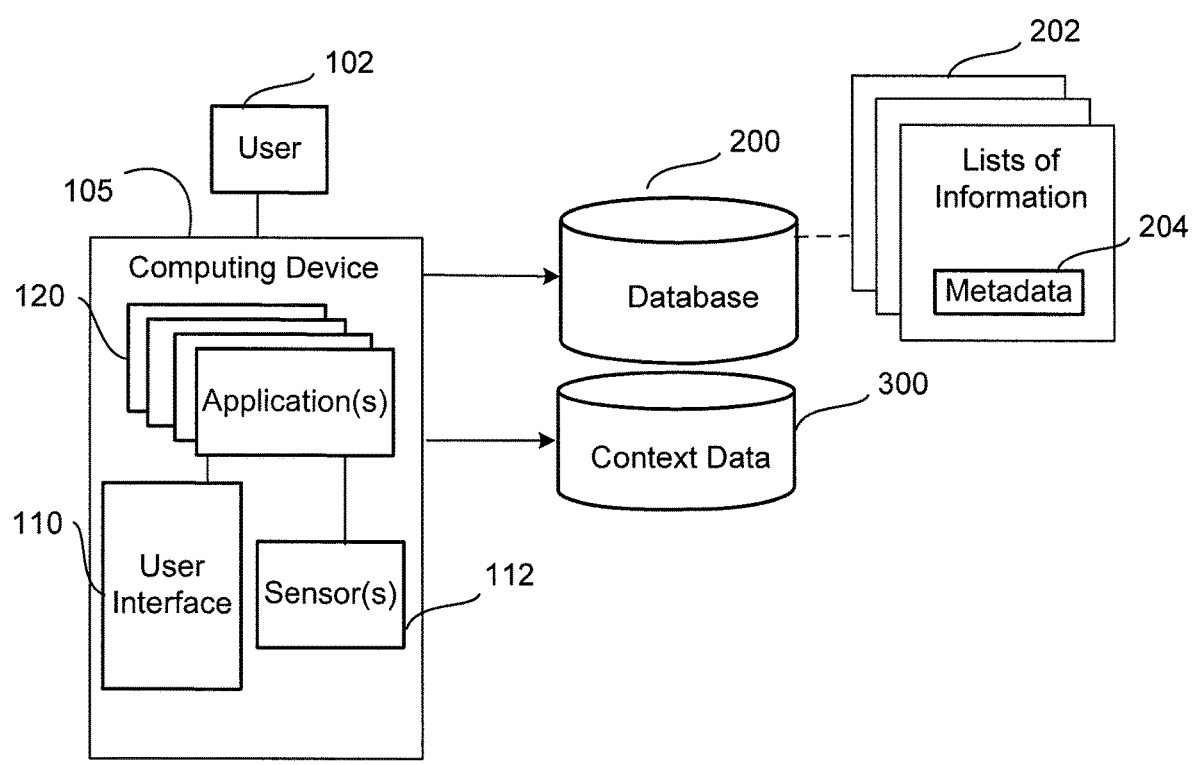
FIG. 2 is a schematic diagram of a system where a suggestion is presented to a user based on information stored in a database and a current context according to some embodiments.

FIG. 2 depicts a schematic of an illustrative embodiment of the system where a user 102 has access to a computing device 105 in a mobile environment. The computing device 105 includes a user interface 110 and one or more sensors 112. A database 200 is accessible by the computing device 105 through storage thereon or through network communication (e.g., Internet, intranet). It can be appreciated that a database can be populated with data according to any suitable method such as user input and/or download. The database 200 contains lists of information 202 that are related to items, services or events. These lists may be specially created to support information presentation applications. However, such lists may be created by a user in connection with other activities. For example, a list of books owned, restaurants visited, friends or interesting travel destinations could be created by a user preparing for a shopping trip, sending holiday greetings or conducting other activities. In some embodiments, lists of information 202 are organized into different categories of information such as those depicted in FIG. 3, discussed further below.

In an embodiment, lists of information 202 include metadata 204 that contains specific information that may be related to individual items or categories of items. Metadata 204 may include information having to do with any aspect about any number of suitable items provided in a list of information, such as records of items that a user may already own as assets or preferences that a user has for particular item(s). For example, a list of wines stored on database 200 may contain metadata 204 that provides details of each wine. Such details might include whether the user owns the wine, from what type of grape the wine was made, the year of the wine, the vineyard where the wine was produced or other relevant pieces of information. A list of wines stored on database 200 may include wines that the user already owns or wines that the user does not own and may have a desire to purchase. Or, for example, a list of wines that are owned by an individual different from the user may be stored on database 200.

Metadata of lists of information may include data related to the priority or degree of interest that the user may have in one or more particular items. In some embodiments, a degree of interest in certain items may be dependent on preference(s) or the possession(s) of other individuals. The preference one individual might have may be weighted more or less than the preference of another individual. For example, a user may weigh the preference of a friend that is closer or more knowledgeable in a particular area over the preference of a different friend. In an embodiment, a social graph can be produced that ranks the preference(s) of other users relative to one another which influence the likelihood of interest(s) of the current user. Such a graph can be updated according to any suitable manner. Indeed, the inclination of a particular individual may or may not influence the preference of the user more or less than another individual.

FIG. 2 also indicates that computing device 105 may contain one or more applications 120 that may access database 200 and context data 300 to determine an appropriate time to make a suggestion to a user and to determine appropriate information to include in the suggestion. Each of the applications 120 may be associated with a specific type of suggestion. For example, one of the applications 120 may be configured to provide a suggestion relating to a book. Others of the applications may be configured to provide suggestions relating to restaurants, movies, products to purchase or any other suitable category of information. Though, it should be appreciated that there is no requirement that each of the applications be associated with a single type of information. For example, an application could be configured to make a suggestion relating to items in the vicinity of computing device 105, regardless of the characteristics of those items.

Each of the applications 120 may be implemented using computer executable instructions in any suitable language. Known programming techniques may be used to form the applications. Such techniques may involve instructions for interacting with a user 102 through user interface 110 and accessing information from sensors 112. Additionally, applications 120 may use known techniques to obtain information from database 200 or to access context data 300. Also, it should be recognized that, though FIG. 2 illustrates applications 120 as executing and computing device 105, the applications may execute on any suitable computing device, including server 106 (FIG. 1).

Applications 120 may be obtained from any suitable source. In some embodiments, applications 120 may be provided by merchants or other parties having a commercial interest in the types of items for which suggestions may be generated. As a specific example, a wine seller may provide an application that user 102 may download from the Internet to computing device 105 to make suggestions concerning types of wine. However, applications obtained from any suitable source may be loaded onto computing device 105 or otherwise used in generating information to suggest to a user of computing device 105.

Figure 3:
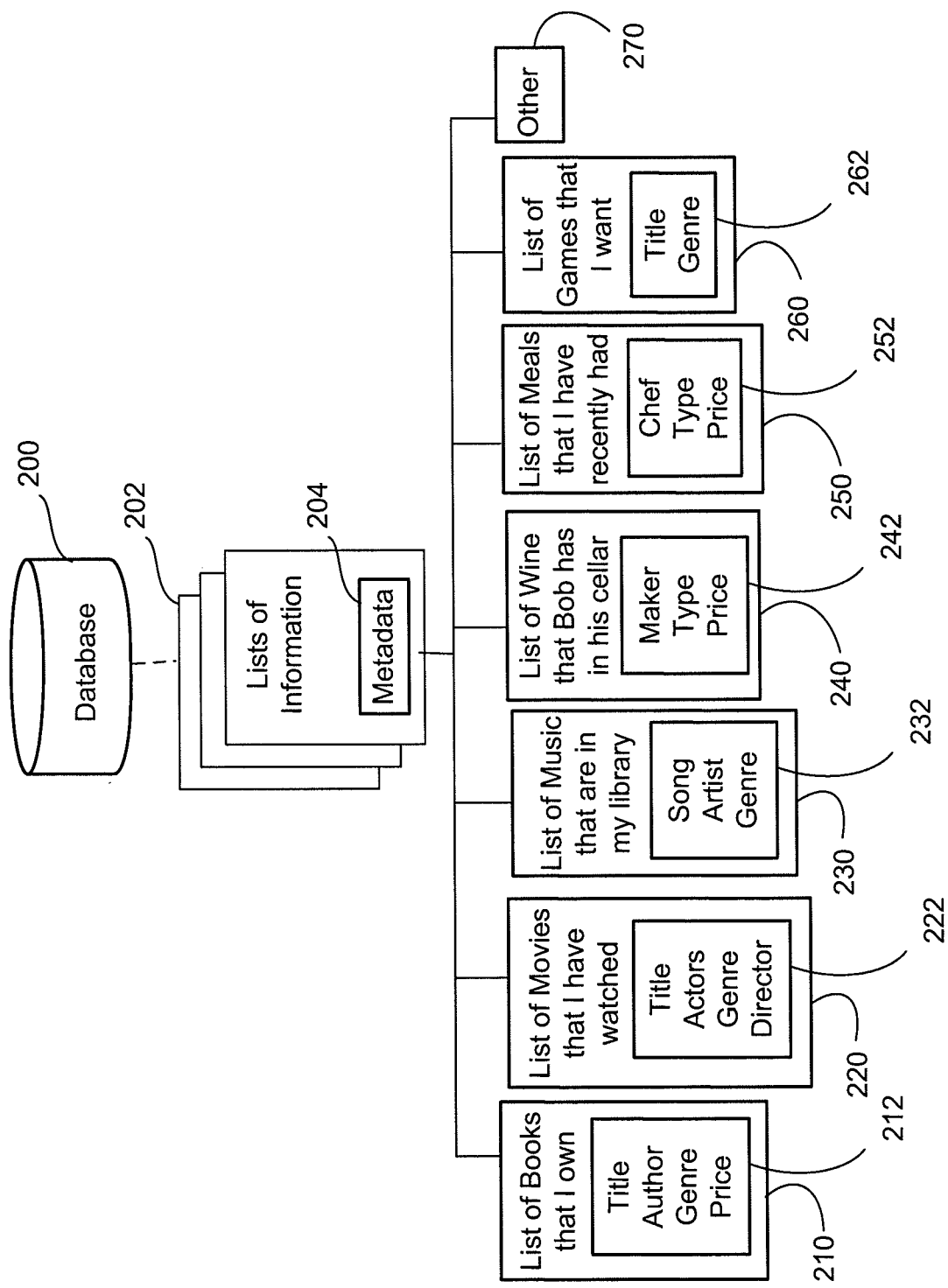
FIG. 3 is a schematic example of data stored in a database.

FIG. 3 illustrates an example of a database 200 having lists of information 202 for a user and metadata 204 associated with the lists of information. For example, one type of list of information 202 may be a collection of books that the user owns 210 that may indicate characteristics 212 of each item on the list, such as book title, author(s) of a book, what genre a book falls under, and the selling price of a book. Another of the lists 202 may include movies that the user has watched 220 that include characteristics of movies such as the title of a movie, actors appearing in a movie, movie genre, and the director of a movie. A further list 202 may include music that is in the user's library 230. Each item in the list may include information that may identify, for each item, characteristics 232 such as song title, song artist, and the genre of a song. A list of wines that a friend, Bob, has in his cellar 240 may also be among the lists 202. Such a list may define characteristics 242 including the maker of a wine, the type of wine, and the selling price of a wine. Another list 202 may identify food that the user has recently had 250 and may identify for each item characteristics 252 such as chef, the type of food, and the price of the food. The user may have interest in games and so the database has a list of games that the user wants 260 where games may be associated with characteristics 262. Such as the title of a game, and genre.

It can be appreciated that any suitable list of information related to any set of items or category of items may be stored in the database 200. FIG. 3 also includes a list of information that describes a category of other items 270 that is stored in the database.

In some embodiments, list 202 may be created specifically for the purpose of making suggestions to a user. However, in some embodiments, the lists in database 200 may represent lists created by or for the user or other associated users during interactions with a computing device unrelated to applications that may suggest information to the user. For example, a list of recently viewed movies may be maintained by a program that provides an interface to a movie rental service. As another example, a list of foods may be compiled by an application that supports online grocery ordering. Accordingly, it should be appreciated that the list 202 may be generated in any suitable way.

In some embodiments, each of the lists may contain metadata 204. Metadata 204 may provide information about the list itself. The metadata 204 may, for example, indicate the source of the list. Alternatively or additionally, metadata 204 may define the types of items included on the list or contexts in which information on the list may be relevant. Such metadata, for example, may be used by applications 120 (FIG. 1) to select appropriate lists in making suggestions to a user. For example, an application 120 may select a list, based on metadata 204 or other suitable criteria, to generate a suggestion based on a current context of user 102.

Referring back to FIG. 2, computing device 105 has one or more sensors 112 that enable the device to obtain context data 300. As discussed above, context data 300 may be accessible to the device through any suitable manner such as a wireless communication (e.g., infrared, cellular network, radio frequency, light energy, acoustics). For example, a sensor 112 may collect information from a server that contains an appropriate data store of information about the user's surrounding context. Alternatively, a sensor 112 may collect digital images or audio signals regarding a surrounding environment through a camera and/or microphone. As another example, sensor 112 may include sensors that collect information about the physical environment of computing device 105. Such sensors may include a location sensor, such as a GPS device. Alternatively or additionally, sensor 112 may include an accelerometer, a compass or other components that may provide location-based information. Further, sensors 112 may include components that indicate temperature, time of day or any other suitable characteristics that may indicate context of user 102. Or, a sensor 112 may gather information from a mobile computing device of a different user. In some embodiments, a computing device 105 is oriented in such a manner that sensor 112 is configured to collect data in a particular direction or plurality of directions. Accordingly, when sensors have the ability to collect data in a directional manner, an orientation and position of computing device 105 may be determined such that an item or location at which the device is pointed may be determined and serve as part of the context.

In addition to including information about a user or activity, context data 300 may include information about a surrounding environment, including any number of items that may form a basis of a suggestion of potential selections from which a user may choose. For example, if the user of the computing device is in a wine shop, sensors 112 may provide information to the computing device 105 of what types of wine in the shop are available from which the user may decide to sample or purchase. Such information, for example, may be acquired using a camera or other optical sensor attached to computing device 105. Though, such information may be acquired in other ways. For example, based on information indicating a location of computing device 105, a sensor 112 may identify that computing device 105 is in a particular wine shop and access a listing of available wines for that shop over the Internet or in any other suitable way. Accordingly, though sensors 112 may be components that simply measure some physical parameter, it should be appreciated that sensors 112 may broadly include any component that acquires or generates information indicative of a context of computing device 105 or user 102.

FIG. 4 provides examples of context data 300 that may be sensed by a mobile computing device 105*a* of a user 102*a*. In one embodiment, context data 300 includes information regarding one or more locations of the mobile computing device 105*a*. For example, at any given moment, the user 102*a* carrying the mobile computing device 105*a* may be in a restaurant 310, a store 320 or a mall 330. If the user 102*a* is in a restaurant 310, the mobile computing device 105*a* may sense information regarding what types of meal(s) may be available along with wine(s) that the user may have the option of consuming. In this regard, sensed context data alternatively or additionally may act as one of the lists 202 (FIG. 2). As another example, if the user 102*a* is in a store 320, the mobile computing device 105*a* may sense information having to do with items present in the store (e.g., books, CDs and DVDs) that the user has the option to purchase. Or, if the user 102*a* is walking in a mall 330, the mobile computing device 105*a* may collect information regarding what particular stores, restaurants or other locations that the user enters. It can be appreciated that contextual information regarding a location may include any suitable setting from which a sensor of the computing device has the ability to gather information.

In addition to current context data, as described above, the computing device may also track past context data as well to consider when forming an hypothesis. For example, a user who is currently in a Mall 330 and had previously entered a clothing store may request a suggestion regarding a certain type of clothing. In forming a hypothesis, the device may have a visit to that clothing store in the context data.

As also shown in FIG. 4, context data 300 may include information collected through a network 108 such as from one or more computing devices via the Internet or an intranet. In addition, context data 300 may include information regarding another user 102*b* who has a mobile computing device 105*b*. User 102*b* may be associated with user 102*a* in any suitable way. For example, user 102*b* and 102*a* may be linked through a social network. Though, the association may not be expressly formed, but may be the result of a shared characteristic, such as an employer or place of residence.

In some embodiments, the other mobile computing device also has access to databases having respective lists of information. Mobile computing device 105*a* may have access to one or more lists of information stored on or accessible to another computing device of a different user. In some embodiments, mobile computing device 105*a* only has limited access to particular lists or portions of lists and another computing device is configured to control access permissions to certain lists of information. In further embodiments, computing devices of particular users detected by mobile computing device 105*a* may be preferred over computing devices of other users according to personal preference(s) of user 102*a* which is based on information stored in device 105*a*.

For a given computing device 105, data is stored as database 200 and context data 300 is sensed. The device may use any suitable algorithm to generate an hypothesis of a selection that the user may have an interest in making. For some embodiments, a vector space algorithm is used to produce an hypothesis. That is, a number of vectors are generated based on information from the database 200 and context data 300. A determination is made as to which of the vectors and to what degree various dimensions of the vectors exhibit a correlation. Based on the hypothesis generated, one or more suggestions of selections that the user may potentially be inclined to choose is produced and presented on the interface 110 of the device so that the user can have knowledge of the suggestion.

Regardless of the specific nature of the context data 300 collected, one or more of the applications 120 (FIG. 2) may use the context data, in combination with lists 202, to generate a hypothesis about information that may be of interest to the user.

In some embodiments, a suggestion is generated by first forming a hypothesis. In some embodiments, the hypothesis will take the form of a selection of a list and a "task" to be performed based on a list. The task may indicate the manner in which information that a user is hypothesized to be interested in can be generated from a list. For example, a "task" may indicate a desire to identify items that are similar to those on a list. As another example of a task, a "task" may indicate that a user is hypothesized to be interested in completing a collection represented by items on a list.

A task to "complete" a list, for example, may be appropriate during a shopping trip when a list represents a collection of items forming an entertainment system. The task of completing the list could be fulfilled by identifying additional items that operate with the items on the list. As a specific example, when the list represents components of a home entertainment system and contains a television and speakers, the task of completing the list may be fulfilled by identifying an amplifier or other components of a home theater system that would operate with the components on the list. As an example of another task, a list could be extended. Though, it should be appreciated that any suitable form of task may be identified. In some embodiments, each of the applications 120 (FIG. 2) may be configured to identify information that fulfills a task. However, there is no requirement that there be a one-to-one relationship between applications 120 and tasks. An application, for example, may be configured to process a list by identifying information fulfilling multiple tasks. In this example, the application may determine the specific task fulfilled in generating information suggested to a user based on context data.

Any suitable mechanism may be used to identify one or more lists and one or more tasks to be used in forming a hypothesis for generating information to suggest to a user. However, in some embodiments, vector space matching may be used. Vector space matching is known in the art, and such techniques may be employed to generate a hypothesis.

In some embodiments, context data is represented as one or more vectors using vector space modeling techniques as are known in the art. Similarly, lists within database 200 may each be represented as one or more vector, using vector space modeling techniques. A high correlation between a vector representing context data and a vector representing a relevant list may be taken as a hypothesis that a user in the current context may be interested in information matching that vector. If there are multiple such correlated vectors, multiple correlated vectors may be identified.

The manner in which the user is interested in that information may be inferred from context data. An application can infer such an interest heuristically, using machine learning and reasoning techniques or in any other suitable way. For example, presence in a store can indicate interest in acquiring items, which may lead to an inference that a user is interested in items similar to those on a list or that complete a list. Such an inference may be used to select a task that is part of the hypothesis.

Regardless of the number of correlated vectors and the specific task, the identified correlated vectors may be taken to define information that may be of interest to a user. A vector or vectors may be derived to represent the hypothesis and then be used to identify relevant information. Vector space matching may be used to identify information by comparing a derived vector or vectors, representing areas of high correlation between context data and a list or lists, to a body of data. If multiple correlated vectors were identified, they may be combined, such as by averaging, finding a mode, or computing some other measure of concentration using vector arithmetic. Alternatively or additionally, multiple correlated vectors may be processed separately, each representing a potential hypothesis that may be prioritized or otherwise processed to present multiple suggestions to a user. Multiple suggestions may be presented concurrently or sequentially.

Each of the applications 120 may be programmed to generate an hypothesis in this way. The specific actions taken by each of the applications may depend on the nature of the application. For example, an application that generates suggestions for a wine may execute when a vector space operation indicates a high correlation between current context data and a list containing information about wine.

In this way, vector space comparisons of context data to lists may result in deriving one or more vectors that may be used to identify further information that may be presented to a user as a suggestion. The specific use of the derived vector to identify a suggestion may depend on the task that is part of the hypothesis. In scenarios when the task indicates finding information about items on the list or identifying other items similar to those on the list, the derived vector may be used in searching for information about items in a larger body of date. As an example, the derived vector may be applied as part of an Internet search to identify relevant information or items. Though, the body of data may be any suitable body of data, including an intranet or a specialized data store.

An application 120 may manipulate the derived vector in any suitable way before applying it to search a body of data. In some instances, depending on the task hypothesized to be of interest to the user, an application 120 may derive a vector from a vector representing correlation between a list and context data by forming an orthogonal vector or projecting a vector into one or more of the dimensions characterizing items on a list or by combining multiple vectors. For example, in a scenario in which the vector space operations indicate a relatively high degree of correlation between context data and multiple lists, the vectors modeling those lists may be averaged or otherwise combined to generate a new vector that is applied when searching a body of data to find information to use as a suggestion. As a specific example, such a situation may arise when database 200 includes a list of favorite wines of user 102, recently purchased wines by user 102 and favorite wines of a friend of user 102. A vector representing context data involving wine may have a high correlation to each such list and a vector may be derived based on correlations with all three lists.

Any suitable technique may be used to model a list as a vector. Though, the characteristics of the items on the list may be regarded as dimensions of the vector. Any meaningful dimension that can be matched may be used in forming a vector representing a list of items.

Similarly, context data may modeled as a vector in any suitable way. For example, from contextual data collected by the sensors, the computing device may generate a scene graph, which serves as a hierarchical data structure that contains geometrical and spatial nodes that represent the user's current and past environments, data related to those nodes and lists of data that the user manages and/or the computing device has access to.

In generating one or more hypotheses, certain context data may be more relevant than other context data For example, relevant contextual data to a hypothesis may include the current physical proximity of a user to a set of items, how recent the user had access to a particular set of items, the time the user spent looking at or considering particular data available in the contextual environment, or other potentially relevant data. In forming an hypothesis, the device may consider similarities between items that are sensed in a current or past context, such as for example, the number and types of restaurants that the user has recently passed by.

Relevancy may be reflected in any suitable way. In some embodiments, only context data identified as more relevant may be used in forming a vector representing the context data. Alternatively or additionally, data identified as more relevant may be used to select weights that are applied as part of vector space operations such that dimensions associated with the data identified as more relevant are more heavily weighted in forming correlations or combining vectors into a derived vector. Such weights may be used to increase or decrease the overall effect on the ultimate matching of a vector to a body of data. In the example in which a user has recently passed multiple restaurants, that information may be used to deemphasize in the matching characteristics associated with the restaurants the user has passed by.

Regardless of the specific technique by which a suggestion is generated, once a suggestion is generated it may be presented to the user. In some embodiments, a number of suggestions are presented to the user simultaneously. For example, a list of suggestions may be displayed to a user of a mobile computing device together on a graphical user interface.

A suggestion may be presented in any suitable manner. In one embodiment, a suggestion is presented as a visual display on a graphical user interface. For example, a suggestion may take on the form of data superimposed on to the user's screen or on a heads up display such as an overlay on a current snapshot location. Suggestions may be presented as abstract visualizations superimposed on a current snapshot location such as by arrows, charts, lighting, shading effects, or the like. In an example, as a user walks through a mall, the mobile computing device may present suggestions as to which stores the user may have an inclination to enter by displaying arrows superimposed on to a current image that point to stores located in the mall. In another embodiment, a suggestion is presented as an audio voice for the user to listen to. Other signals may also be suitable as a suggestion, such as vibration or touch feedback presented by the device. For example, when the user moves closer proximity to a particular item that the device suggests, the device may signal the user through increasing vibration as the user and the item come closer to one another. It can be appreciated that suggestions may be presented in a number of ways, including ways that promote interaction with the user. For example, upon presentation of a suggestion on a display of a user interface, the user may have the option to rule out certain suggestions, add/remove information to update other suggestions, and/or indicate the value of or how helpful suggestions are.

Regardless of the format in which the suggestion is presented, in some embodiments, the suggestion may be presented in connection with information explaining to the user how the suggestion was generated. The explanatory information may include, for example, an identification of the hypothesis used in generating the suggestion. As a specific example, the explanatory information may identify a list or, in appropriate circumstances, multiple lists, used in generating the selection along with a hypothesized task of interest to the user. As a specific example, when presenting a suggestion for a book, the system may present explanatory information indicating that the suggestion was derived by finding books similar to those on a list of the user's previously read books. As another example, the explanatory information may indicate that the suggestion was derived by identifying books for sale in a particular book store that are similar to books on lists of recommended books kept by three of the user's friends associated with the user through a social network.

Regardless of the form in which a suggestion is presented to a user, the suggestion may be triggered by any suitable event. In some embodiments, each of the applications 120 may monitor context data and generate a suggestion in response to a detected condition. In other embodiments, user input may trigger one or more of the applications 120 to generate an hypothesis, leading to presentation of a suggestion to the user. In some embodiments, an hypothesis is generated and a suggestion is presented upon a user query, provided either explicitly or implicitly to the computing device, for a suggestion. For example, an explicit user query may involve the user inputting into the computing device a request that a suggestion be presented for a particular set of options. An example of an implicit user query may involve the user performing a search on a category of items or, for example, pointing the device to a particular product in a store, and without eliciting the device for a suggestion, the computing device presents a suggestion to the user based on a hypothesis of why the user pointed at the product. In other embodiments, when the computing device senses contextual data, the default mode for the device may be for a hypothesis to be automatically generated and a suggestion as to a potential selection is automatically presented without any explicit or implicit user query for such a suggestion.

As an example, a user carrying a mobile computing device may be currently located in a book store. The mobile computing device may have access to lists of information such as books that the user already owns. The information also includes data regarding what kind of books the user likes, for example, books in the science-fiction genre. Accessible on the device is information regarding what science-fiction books friends of the user prefer or recommend. The user performs a search on the mobile computing device for books that are available for purchase in the book store. An application running on the mobile computing device interprets the search as an implicit query from the user for a suggestion to be presented to the user for a book to consider for purchase.

Context data, in addition to potentially triggering an hypothesis to be generated and being used in forming the hypothesis, may also be used to filter a search for information matching the hypothesis. For example, if the hypothesis is that the user is interested in acquiring an item of a certain type, context data may be used to filter results of a search for items of that type to limit search results to only items of that type that are available in the user's location. In the example in which the generated hypothesis is that a user would like to acquire a book, the mobile computing device may collect context data regarding what specific books may be available as choices for the user to peruse and possibly make a decision to purchase. Context data is gathered, for example, through interaction of the mobile computing device with a server within a store. Context data may also be gathered from images of portions of the store that the device has collected, for example, with a digital camera.

Figure 5A:
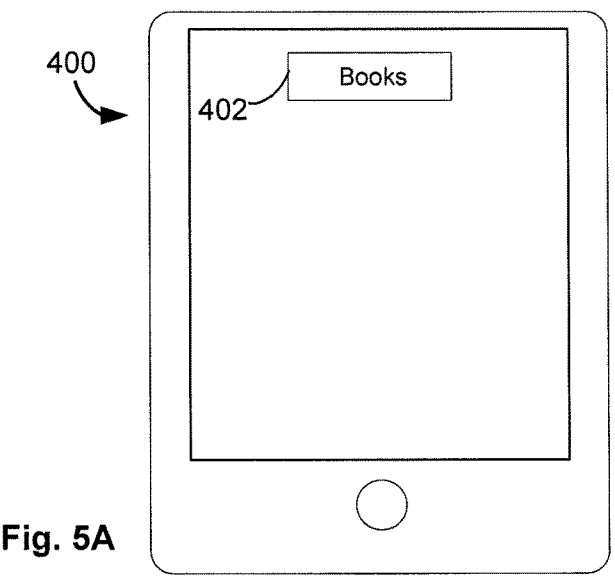
FIGS. 5A-5C are diagrams of an exemplary user interface where a request for information is received and data sets are displayed in response to the request for information.
Figure 5B:
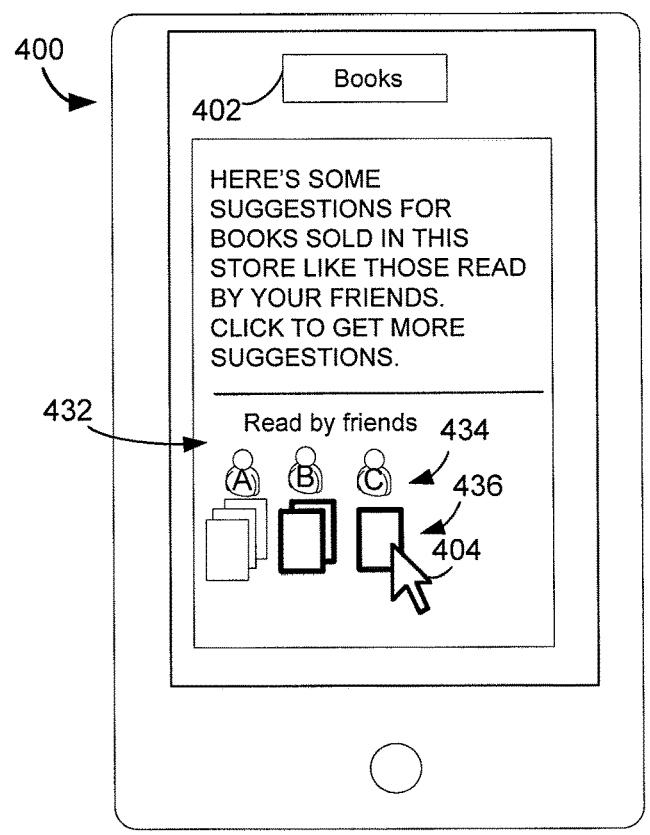
Figure 5C:
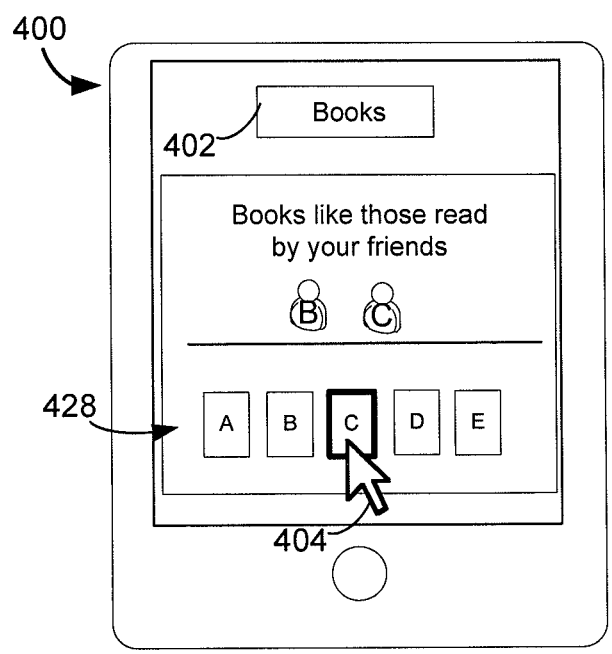

FIGS. 5A-5C provide examples of user interfaces that may be generated by an application 120 (FIG. 2) that suggests books. In FIG. 5A, a user may input a request for information on "Books," as indicated in component 402. The request may be received via any suitable means and in any suitable manner. For example, the user may type in the word "book" or "books" in a field of user interface 400 of a mobile electronic device. It should be appreciated that the display may comprise any suitable controls, such as a scroll wheel, a rotatable wheel, buttons including one or more touch buttons and any other controls, which are not shown for the simplicity of representation. Also, the user interface may comprise any other suitable information that is not displayed for the sake of simplicity.

In response to receiving the user input comprising the request for information on "Books," which may trigger the application to execute. As a result, an information retrieval and presentation system in accordance with some embodiments may generate data sets that each may fulfill one or more tasks relating to the request for information. In this example, context data may indicate that the user is in a bookstore. Accordingly, the hypothesis may be generated that the user is interested in purchasing a book. The hypothesis may also include that the user is interested in purchasing a book like those read by the user's friends. Accordingly, in response to the user input indicating an interest in books, the system may generate suggestions for books based on lists of books read by friends of the user. Such lists may be accessed in any suitable way, such as through a networked system through which users linked as friends may share information.

Regardless of the manner in which the lists are accessed, the device may present suggestions through user interface 400 that is illustrated in FIG. 5B. FIG. 5B shows suggestion 432. In this case, suggestion 432 includes multiple suggestions, each associated with a friend of the user. In this case, friends 434 are indicated as friends A, B and C.

Once suggestions are presented, a user may interact with the suggestions in any suitable way. In some embodiments, a user may interact with the suggestions by manipulating an input mechanism, such as cursor 404, to select one of the items presented in suggestions 436. In such an embodiment, user input indicating a selection of one of the suggestions may result in the mobile device obtaining further information on the selected item.

In other embodiments, a user may interact with the suggestions through the user interface so as to cause the device to determine different or additional suggestions. For example, in the state illustrated in FIG. 5B, a user may indicate one or more of the friends 434 and then provide input requesting further suggestions based on similarities to lists of books read by those friends. In the specific example of FIG. 5B, a user has manipulated cursor 404 to identify friends B and C. Accordingly, in FIG. 5C, user interface 400 includes new suggestions 428. Suggestions 428 contain books like those read by friends B and C. These suggestions may be generated based on lists of books read by those friends using vector space matching generated based on lists for those friends or in any other suitable way.

FIG. 5C illustrates a further example of a mechanism in which a user may interact with suggestions. In this case, a user has selected book C from the suggestions 428. In response to such a suggestion, additional information may be provided about book C. Though, it should be appreciated that the specific types of interaction that can be performed based on suggestions may depend on the specific construction of the application 120 (FIG. 2) used to generate the selection. Accordingly, by appropriate construction of applications 120 any suitable number and type of interactions may be supported once suggestions are generated.

Any suitable application may be employed on a computing device so as to provide a user interface that displays suggestions based on hypotheses generated from information related to a user and context data of the user. The application may be rendered with any suitable technology to provide an appropriate software interface on the display of a computing device. For example, Microsoft Silverlight is a suitable web application framework that integrates highly graphical interactivity into a runtime environment. Other software frameworks may also be suitable such as Objective-C or HTML5. In some embodiments, prior to the device sensing context data that may relate to a generated hypothesis, a suitable application is downloaded and installed on to a mobile computing device. The application can be helpful to focus what information is sensed by the mobile computing device when the application is running, reducing extraneous noise. For instance, the application may serve to instruct the device to form a hypothesis directed to a particular subject area and present an appropriate suggestion.

For example, when an application directs the computing device to provide a suggestion to the user as what food to consume for a meal, when the application is running, information sensed by the mobile computing device may be limited to that which is relevant to what foods may be available to the user as meal options.

Figure 6:
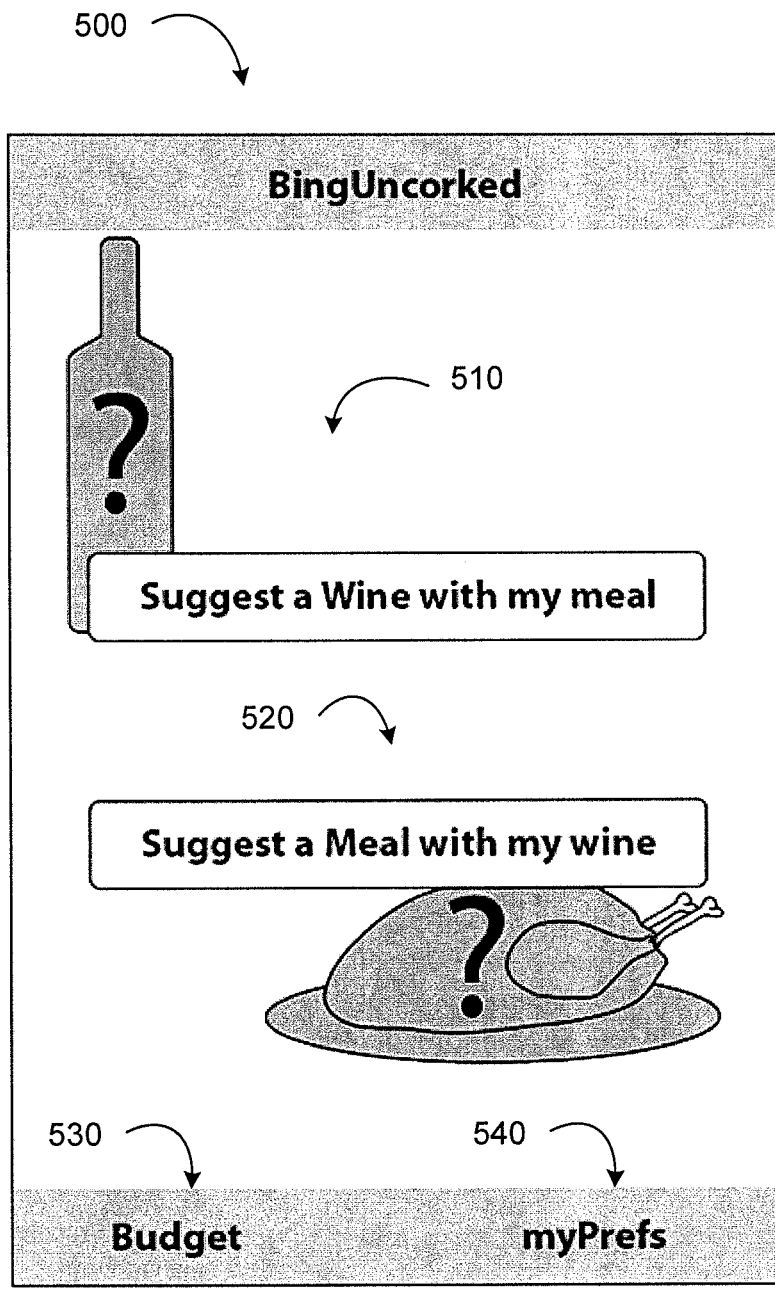
FIG. 6 is a diagram of an exemplary user interface that presents options for a user to query the computing device for a suggestion of meal options based on a hypothesis.

As an example, FIG. 6 depicts an illustrative example of a user interface that may be generated by an application 500 called "BingUncorked" executing on a mobile computing device. Such an application may be used when a person is undecided as to what food or wine to choose for a meal such as when the person is in a restaurant or is shopping for food items at a grocery store. Hypotheses may then be generated according to lists of information and context data related to food and wine. Based on information related to the user, such as what foods the user has recently had and other data sensed of the surrounding context, suggestions may be presented on the display as to what type of wine or food the user may be interested in consuming.

Shown on the display 500 is an icon that offers to suggest a wine with a meal 510 as well as an icon that offers to suggest a meal with a wine 520. If the user selects the icon that offers to suggest a wine 510 (e.g., by touching the icon of the wine bottle), the display is modified to show one or more suggestions of a specific wine that may work well in the context of the user. If the user selects the icon that offers to suggest a meal 520 (e.g., by touching the food icon), the display is modified to show suggestion(s) as to a potentially preferred meal. The user may then decide whether to choose one of the wine or meal suggestions. In some cases, the user will have already chosen a meal and would like a suggestion to be provided as to a suitable wine to go with the meal, or vice versa.

An application may also support various filtering criteria that may be supplied by a user. The application illustrated by FIG. 6 may filter suggestions according to a budget under which the user is limited. In this respect, the user selects the budget icon 530 that enables the user to input what the current budget is for the meal and/or wine, effectively limiting the number of possible suggestions available. Entering a budget may occur at any time in the suggestion and selection process. Accordingly, if a list of suggestions are presented on the display and the budget is increased, the list of the suggestions may dynamically increase. Similarly, a list of suggestions may dynamically decrease as a budget is decreased. In addition, user preferences as to a wine or meal selection may be suitably edited. The user may select the myPrefs icon 540, permitting the user to edit what his/her current meal and/or wine preferences are. In some embodiments, a presented list of suggestions may change dynamically according what user preferences are entered into the device through application 500.

Figure 7:
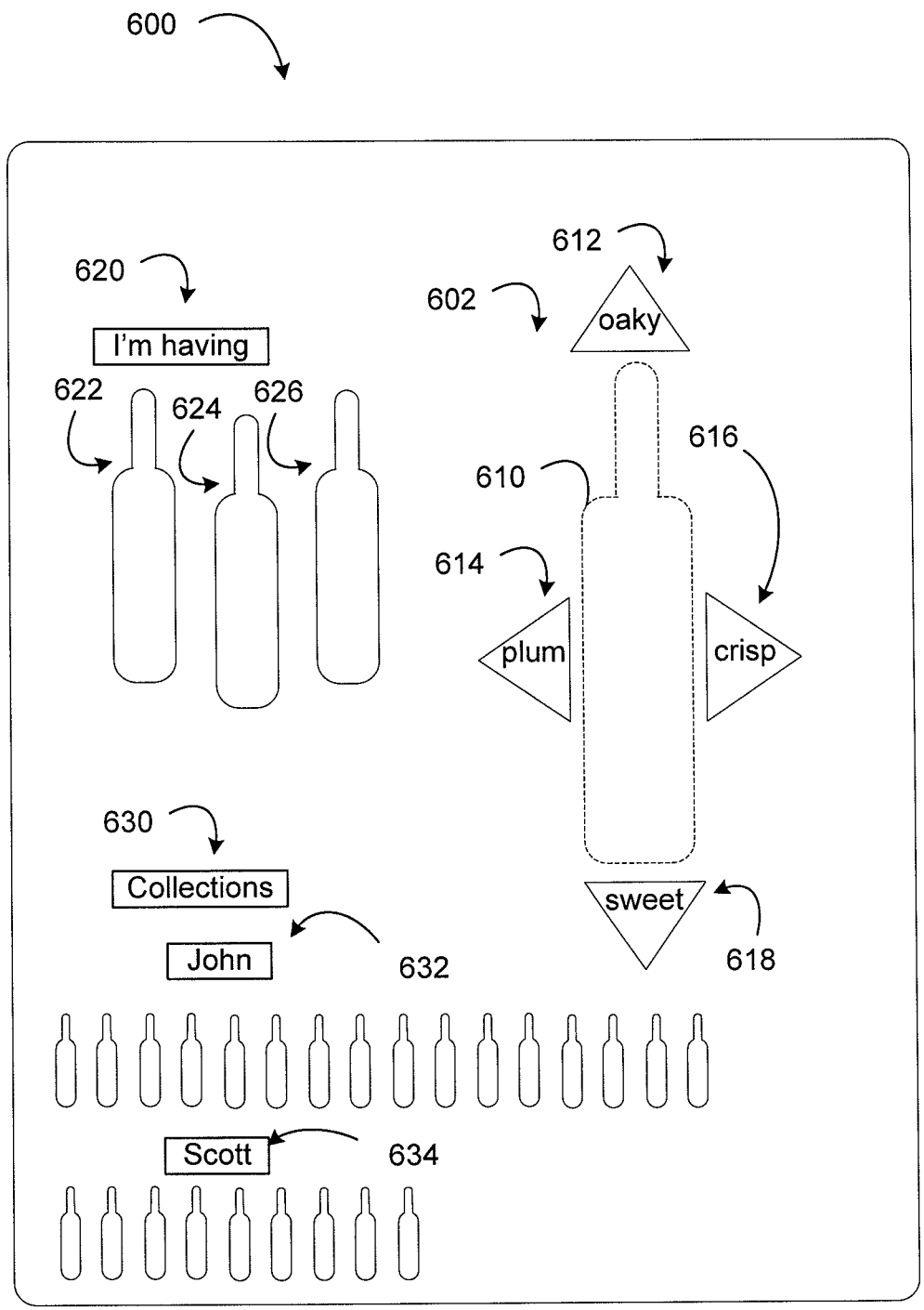
FIG. 7 is an illustrative example of a user interface that presents a method for providing wine recommendations to a user.

In another example, FIG. 7 illustrates user interface 600 of an application executing on computing device where a user is presented with suggestions as to types of wine, These suggestions may be filtered by context or other criteria. For example, the suggestions may be limited to wines sensed by the device as available in a restaurant or store where the user is located. Hypotheses may be generated as to types of wine that may be preferred by the user based on one or more lists. As discussed above, for example, in creating and presenting a suggestion to a user, the preferences or assets of friends can also be taken into account. In some cases, the preferences of certain friends may be weighed with greater priority than other friends. For example, friends that are closer in proximity at a certain time than other friends may carry a greater priority. Or, friends whose opinions should be more closely considered than other friends may carry more weight in making a suggestion. In other cases, whether a friend already has an item as an asset may bear upon what type of suggestion may be presented to the user. For example, if the friend already has a particular wine that is currently available, based on a hypothesis that generates suggestions of wines that friends of the user do not already have, the device may present a suggestion to the user of a wine other than that which the friend already owns.

The display 600 shows lists of wine collections 630 of friends that are in close proximity to the device. In an embodiment, the mobile computing device detects computing devices of other users that are nearby, the computing devices providing access to lists of respective wine collections on those other devices. For example, a nearby computing device of user John has access to data that indicates John's wine collection 632 contains 16 different bottles of wine. Another nearby computing device of user Scott has access to data indicating that Scott's wine collection 634 includes 9 different bottles of wine.

In creating a hypothesis as to what wine a user would prefer, for some embodiments, the application considers the wine that users John and Scott already own in a collection and may generate a hypothesis, such as the user may like a suggestion for wines like those owned by John and Scott. Accordingly, the mobile computing device using the application formulates a hypothesis that takes into account information regarding current selections 620, wine collections of others 630, and contextual data of wine that is currently available. Based on the hypothesis, the application generates, a suggestion that may be presented as icon 610 on the display of the mobile computing device. the user may be presented with an option to modify the suggestions with a wine designer feature 602. In this example, the user indicates a desire to modify the suggestion represented by icon 610 by manipulating controls, such as controls 612, 614, 616 and 618 presented in graphical user interface 600.

In the example illustrated, each of the controls corresponds to a dimension of a vector that may be derived by intersecting one or more lists with context data. In the specific example of FIG. 7, a vector may be derived by intersecting a vector modeling current selections 620 with vectors modeling a vector modeling John's collection 632 and a vector representing Scott's collection 634. Such a vector may initially be used to perform a search for similar items over a body of data, as described above, resulting in an initial suggestion represented by icon 610.

The derived vector may have dimensions corresponding with the controls 612, 614, 616 and 618. Accordingly, user input through any of the controls 612, 614, 616 and 618 may be interpreted by an application generating user interface 600 as a command to modify the derived vector along one or more of its dimensions. In response to such input, the application may modify the derived vector and, using vector space matching techniques, reapply the derived vector in a search of a body of data to possibly generate a new selection, replacing the suggestion depicted in icon 610. In this way, a user may interact with an application to modify an initial suggestion based on an hypothesis generated from lists of available information and context data.

Though, it should be appreciated that an application may respond to user input in any suitable way.

Figure 8:
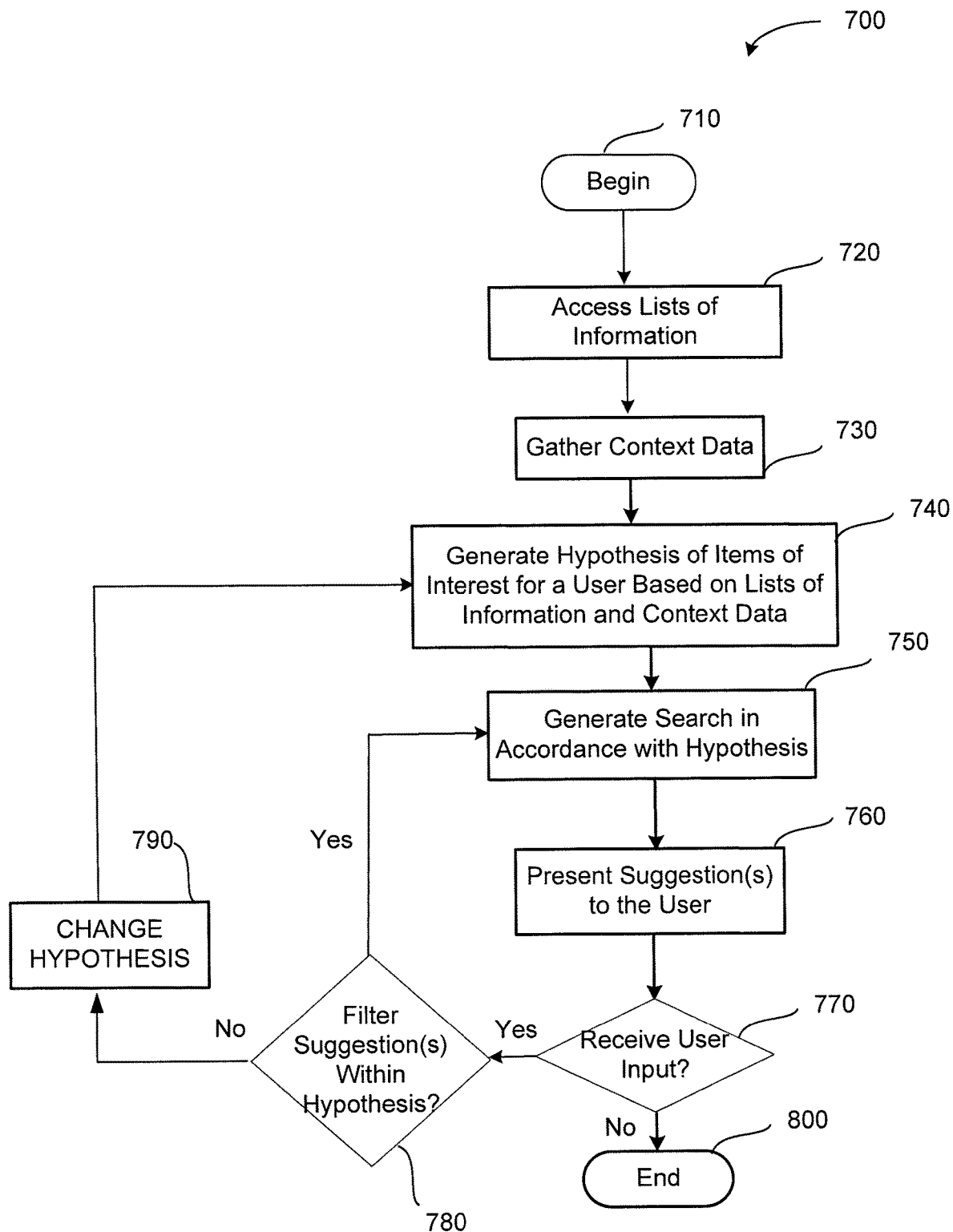
FIG. 8 is a flow chart of an exemplary process of operating a system for presenting suggestions to a user regarding a potential selection according to some embodiments.

FIG. 8 depicts a flowchart of a process 700 that a system performs in providing a user with a suggestion based on a hypothesis and receiving input as to the suggestion and/or hypothesis. These steps may be controlled by an application 120, executing on at least one processor. Through the specific control mechanisms is not critical.

The beginning step of the process 710 is initiated through any suitable method. In an embodiment, user input starting a software application initiates the system. In another embodiment, turning on a mobile computing device automatically initiates the system. Once the process flow has begun, step 720 includes accessing lists of information that are relevant to the user. Next, according to step 730, the system gathers context data regarding aspects of a surrounding environment, such as items that are available to acquire.

In step 740, the system generates a hypothesis of items that are of potential interest to a user based on the lists of information and the context data. The hypothesis can be premised, for example, on an inclination for a user to complete, modify or extend one or more lists of information based on the context data. In step 750, a search is performed in accordance with the hypothesis. That is, based on the hypothesis, a body of data is searched for information consistent with the hypothesis. In some embodiments, a vector space matching algorithm is used for searching where a hypothesis is represented as a derived vector and searches are conducted to identify items in the body of data that correlate with that vector. It can be appreciated that other algorithms for performing searches within hypotheses are also possible.

In step 760, the system provides one or more suggestions to the user according to the hypothesis from step 740 and the search for appropriate items in step 750.

Having been presented with the suggestion(s), the user is free to make a decision as to whether to follow the suggestion(s) or not. In step 770, the user has the ability to provide feedback to the system in the form of a user input. In some embodiments, user input provides additional information for an updated search for items within the existing hypothesis to be conducted so as to filter the suggestions with added criteria at step 780. For example, the number of suggestions may be too great so a refined search may be desirable. Additional information may also include positive or negative preference of a user, or a modification in user assets and/or experiences that can further filter the amount of potential selections.

In another instance, user input provides information that requests the system to change its underlying hypothesis altogether 790. For example, a request is made for a hypothesis to be made based on different lists of information and/or different context data. In other scenarios, user input may indicate that a different task should be used in the hypothesis. For example, a hypothesis may be based on an assumed task of finding items similar to those in a list. User input may indicate that the task should be changed to completing a list or extending a list.

It can be appreciated that providing feedback to the system through a user input is not a requirement of that described herein. Alternatively, for some embodiments, providing user input resulting in updated suggestions to the user is a process that is transparent to the user. That is, actions the user takes may implicitly provide feedback to the device so as to filter future suggestions or change the hypothesis completely.

The overall process of providing a suggestion to a user can terminate in step 800. For example, closing out of a software application may temporarily terminate the system. Turning off a mobile computing device may automatically terminate the system.

In this way, a user may be presented with suggestions that are likely to relevant to the user. These suggestions may be more relevant than if generated based on extensive amounts of context data that may be available to the user or user device.

Having thus described several aspects of at least one embodiment of this invention, it is to be appreciated that various alterations, modifications, and improvements will readily occur to those skilled in the art.

For example, it should be appreciated that, though the term "list" is used, no specific organization of information is required. A list, for example, may be any collection of items that are related in one or more dimensions. Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, digitizing tablets, and touch-responsive display screen, such as direct-interaction displays, multi-touch displays that respond to two or more fingers on the screen at the same time. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer-readable medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer-readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that, when executed, perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of providing a suggestion to a user, comprising:
    sensing context data related to a user environment through at least one sensor of a processing device, wherein the sensed context data is modelled as a vector by generating a scene graph, the scene graph being a hierarchical data structure comprising geometrical and spatial nodes that represent a user's current and past environments, data related to those nodes, and lists of data that the user manages;
    generating a hypothesis of information of interest to a user, based on one or more lists of items reflecting a preference of the user and the sensed context data, by generating at least two vectors comprising one vector that is based on the one or more lists of items and another vector that is based on the sensed context data and assessing a degree in which the generated vectors match by determining to what degree various dimensions of the generated vectors exhibit a correlation using vector space modeling; and identifying at least one item consistent with the hypothesis, for presentation to the user as a suggestion, based on the generated hypothesis.

2. The method of claim 1, further comprising:
receiving input on the processing device; and
modifying the hypothesized information of interest to the user presented on the display, in response to the received input.

3. The method of claim 1, wherein the one or more lists of items includes at least one user created list of information.

4. The method of claim 1, wherein the one or more lists of items includes at least one list of information related to one or more friends of the user.

5. The method of claim 1, wherein the processing device is a first processing device and, wherein the one or more lists of items is stored on a second processing device.

6. The method of claim 1, wherein the processing device is a first processing device and, wherein the sensing context data comprises sensing information related to at least a second processing device of another user.

7. The method of claim 1, wherein the sensing context data comprises sensing information related to a location of the processing device or an activity of a user of the processing device.

8. The method of claim 1, wherein the sensing context data includes sensing information related to a plurality of items that are in close proximity to the user.

9. The method of claim 1, further comprising receiving user input via a user interface of the processing device, the receiving resulting in generation of an alternative hypothesis of information of interest to the user.

10. The method of claim 1, further comprising receiving user input via a user interface of the processing device, the receiving resulting in generation of a search query based on the user input.

11. A method comprising:
sensing context data of an environment, through at least one sensor of a mobile computing device, wherein the sensed context data is modelled as a vector by generating a scene graph, the scene graph being a hierarchical data structure comprising geometrical and spatial nodes that represent a user's current and past environments, data related to those nodes, and lists of data that the user manages;
generating a vector based on at least one list of items;
generating a vector based on the sensed context data; and
formulating a hypothesis of an item of interest to a user of the mobile computing device, the formulating being based on an implicit user query, which is based on a degree of correlation between the generated vectors, the degree being based on a determination of to what degree various dimensions of the generated vectors exhibit a correlation using vector space modeling.

12. The method of claim 11, further comprising:
displaying, on a user interface of the mobile computing device, a suggestion of the hypothesized item of interest;

receiving user input on the user interface relating to the displayed suggestion;
generating an alternative vector based on an alternative list of items;
formulating an alternative hypothesis of an alternative item of interest to the user based on correlation between the alternative vector based on the alternative list of items and the vector based on the context data; and
modifying the display on the user interface to display an alternative suggestion based on the alternative hypothesis of the alternative item of interest to the user.

13. The method of claim 12, wherein the hypotheses are that the user is interested in information about an item that will fulfill a task based on one or more lists.

14. A device, comprising:
a sensor;
one or more processors; and
an electronic storage that stores processing instructions that, when executed by the one or more processors, cause the execution of a series of acts, including:
gathering context data of an environment surrounding the device via the sensor, wherein the gathered context data is modelled as a vector by generating a scene graph, the scene graph being a hierarchical data structure comprising geometrical and spatial nodes that represent a user's current and past environments, data related to those nodes, and lists of data that the user manages;
generating a hypothesis of information of interest to a user of the device, based on one or more lists of items reflecting a preference of the user and the sensed context data, by
generating at least two vectors, one vector that is based on the one or more lists of items and another vector that is based on the sensed context data and
then assessing a degree in which the generated vectors match by determining to what degree various dimensions of the generated vectors exhibit a correlation using vector space modeling; and
identifying at least one item consistent with the hypothesis for presentation to the user as a suggestion, based on a search performed in accordance with the generated hypothesis.

15. The device of claim 14, wherein only context data that satisfies a relevance threshold are used in the generating at least two vectors.

16. The device of claim 14, wherein the context data comprises items that are available to acquire.

17. The device of claim 14, wherein the one or more lists of items includes at least one list of information related to a friend of the user.

18. The device of claim 14, wherein the processing device is a first processing device and, wherein the one or more lists of items is stored on a second processing device of another user.

19. The device of claim 14, wherein the processing device is a first processing device, and wherein the sensing context data comprises sensing information related to at least a second processing device of another user.

20. The method of claim 1, wherein the suggestion is presented via a visual display on a graphical user interface, and wherein the suggestion is presented in the form of an abstract visualization superimposed on an overlay on a current snapshot location.

* * * * *